US012710373B2

(12) United States Patent
Gonta et al.

(10) Patent No.: US 12,710,373 B2
(45) Date of Patent: Aug. 18, 2026

(54) SYSTEMS AND METHODS FOR RELIABLE AUTHENTICATION OF JEWELRY AND/OR GEMSTONES

(71) Applicant: OINO LLC, New York, NY (US)

(72) Inventors: Igor Gonta, New York, NY (US); Tiara Denise Headen, Mount Vernon, NY (US); Steven Lawrence Zell, Merrick, NY (US)

( * ) Notice: Subject to any disclaimer, the term of this patent is extended or adjusted under 35 U.S.C. 154(b) by 0 days.

(21) Appl. No.: 18/957,287

(22) Filed: Nov. 22, 2024

(65) Prior Publication Data

US 2025/0343700 A1 Nov. 6, 2025

Related U.S. Application Data

(63) Continuation of application No. PCT/US2023/023360, filed on May 24, 2023.

(Continued)

(51) Int. Cl.

*G01N 21/87* (2006.01)
*A44C 17/00* (2006.01)

(Continued)

(52) U.S. Cl.

CPC ............. *G01N 21/87* (2013.01); *A44C 17/00* (2013.01); *G06F 21/108* (2023.08); *G06N 3/0464* (2023.01); *G06N 3/08* (2013.01); *G06Q 20/3825* (2013.01); *G06Q 20/389* (2013.01); *G06Q 20/401* (2013.01); *G06Q 20/40145* (2013.01); *G06Q 30/0629* (2013.01);

(Continued)

(58) Field of Classification Search

CPC ............................ H04L 9/3247; G06F 21/108

See application file for complete search history.

(56) References Cited

U.S. PATENT DOCUMENTS

| | | | | |
|---|---|---|---|---|
| 8,245,922 | B2 * | 8/2012 | Gerigk | G07D 7/0043 235/380 |
| 10,599,825 | B1 * | 3/2020 | Benkreira | H04L 63/0853 |

(Continued)

FOREIGN PATENT DOCUMENTS

| | | | |
|---|---|---|---|
| CA | 2621225 | C | 11/2009 |
| CN | 112881307 | A | 6/2021 |

(Continued)

OTHER PUBLICATIONS

"An All in One Solution for Brands to Leverage the Open-Source Arianee Protocol", Arianee, 2022, 9 pages.

(Continued)

*Primary Examiner* — Viral S Lakhia

(74) *Attorney, Agent, or Firm* — Thompson Coburn LLP

(57) ABSTRACT

A variety of techniques for authentication of jewelry and gemstones is provided. With some example embodiments, blockchain may be used to store a reference signature for the jewelry/gemstone, and a digital asset such as a non-fungible token can link this reference signature with the physical jewelry/gemstone. During an authentication process, the reference signature stored on the blockchain can be accessed and compared with a test signature derived from an item that is purported to be the original jewelry/gemstone to determine whether they match to support a declaration that the purported jewelry/gemstone is authentic.

20 Claims, 8 Drawing Sheets

Related U.S. Application Data

(60) Provisional application No. 63/345,747, filed on May 25, 2022.

(51) Int. Cl.

| | |
|---|---|
| ***G06F 21/10*** | (2013.01) |
| ***G06N 3/0464*** | (2023.01) |
| ***G06N 3/08*** | (2023.01) |
| ***G06Q 20/38*** | (2012.01) |
| ***G06Q 20/40*** | (2012.01) |
| ***G06Q 30/0601*** | (2023.01) |
| ***G06V 10/44*** | (2022.01) |
| ***G06V 10/82*** | (2022.01) |
| ***H04L 9/00*** | (2022.01) |
| ***H04L 9/32*** | (2006.01) |

(52) U.S. Cl.

CPC .............. *G06V 10/44* (2022.01); *G06V 10/82* (2022.01); *H04L 9/3231* (2013.01); *H04L 9/3247* (2013.01); *H04L 9/50* (2022.05)

(56) References Cited

U.S. PATENT DOCUMENTS

| | | | | |
|---|---|---|---|---|
| 11,153,508 | B2 | 10/2021 | Harfouche et al. | |
| 11,501,297 | B1 | 11/2022 | Tai et al. | |
| 11,575,517 | B2 * | 2/2023 | Wentz | H04L 9/3297 |
| 11,741,517 | B1 * | 8/2023 | Eidam | G06Q 10/101 705/26.41 |
| 12,072,294 | B2 | 8/2024 | Gonta et al. | |
| 12,099,015 | B2 | 9/2024 | Gonta et al. | |
| 12,567,974 | B2 * | 3/2026 | Webster | H04L 9/3247 |
| 2014/0139608 | A1 | 5/2014 | Rosario et al. | |
| 2015/0223580 | A1 | 8/2015 | Kinney et al. | |
| 2016/0232432 | A1 | 8/2016 | Regev | |
| 2017/0032285 | A1 | 2/2017 | Sharma et al. | |
| 2020/0143032 | A1 | 5/2020 | Horstmeyer et al. | |
| 2020/0259643 | A1 | 8/2020 | Pazhoor et al. | |
| 2021/0012332 | A1 | 1/2021 | Ow et al. | |
| 2021/0133176 | A1 | 5/2021 | Kinney | |
| 2021/0158118 | A1 | 5/2021 | Benderly | |
| 2021/0326852 | A1 | 10/2021 | Yantis et al. | |
| 2021/0390531 | A1 | 12/2021 | Voorhees et al. | |
| 2022/0398460 | A1 | 12/2022 | Dalli et al. | |

FOREIGN PATENT DOCUMENTS

| | | | |
|---|---|---|---|
| WO | 2021092067 | A1 | 5/2021 |
| WO | 2022072577 | A1 | 4/2022 |

OTHER PUBLICATIONS

"Arianee Smart-Link Connecting Owners, Assets, and Brands", White Paper, Accessed Online May 10, 2022, 52 pages.
"Convolutional Neural Networks", Ranzato, Accessed Online May 11, 2022, 16 pages.
"Global Digital Assets, Putting wealth to work, for growth and impact", Elitium, Accessed Online May 10, 2022, 13 pages.
"ITraceiT rolls out block-chain based application for tracing diamonds, gemstones, and jewelry", Rough and Polished, Apr. 7, 2022, 3 pages.
"Multiverse The Beginning of a New Digital Economy", Lukso Blockchain GmbH, Accessed Online May 10, 2022, 4 pages.
"Physical NFT Ecosystem", Veracity Protocol, 2022, 4 pages.
"The Hardest Asset Is Now Liquid", Icecap, 2022, 10 pages.
"The Industry Standard for Fingerprinting Fine Art, Collectibles, and Luxury Goods", Mira Imaging. All, 2021, 5 pages.
"The Protocol of Trust for Physical Objects", Veracity Protocol, 2022, 7 pages.
"VeChain Thor", Vechain Foundation, downloaded from https://vechain.org/, 2019, 20 pages.
"VeChain Whitepaper 2.0" VeChain Foundation, Dec. 2019, 55 pages.
"Whitepaper", Elitium, downloaded from www.elitium.io, Apr. 2020, 35 pages.
Banon et al., "Boson Protocol White Paper Decentralized Autonomous Commerce", Whitepaper Version 1.1, Nov. 1, 2020, 50 pages.
Campbell, "QR codes out and scannable images are in at Louis Vuitton" QR Code Press, Nov. 18, 2013, 5 pages.
Chainlink, Secure Multi-Party Computation, Web3, Apr. 3, 2023, 11 pages.
International Search Report and Written Opinion for PCT/US23/23360 dated Aug. 22, 2023.
Krzemnicki, "Securing the Identity of Diamonds" Opsydia Limited 2018-2022, 14 pages.
Kumi, "Chainlink Drives Web3 Pivacy Revolution with Secure Multi-Party Computation: LINK price impact ahead", Crypto News Flash, Apr. 4, 2023, 4 pages.
Office Action for U.S. Appl. No. 18/201,870 dated Dec. 7, 2023.
Penington, "Icecap Announces Six Luxurious Jewelry Pieces for NFT BAZL Dubai", Newsfile Corp., Oct. 8, 2021, 2 pages.
Prosecution History for U.S. Appl. No. 18/201,852, filed May 25, 2023, now U.S. Pat. No. 12,072,294, granted Aug. 27, 2024.
Prosecution History for U.S. Appl. No. 18/201,861, filed May 25, 2023, now U.S. Pat. No. 12,099,015, granted Sep. 24, 2024.
Rosenblatt, "Crypto-art is here to stay, NFTs will become mainstream: 1stDibs CEO", CTV New Sites, downloaded from http://www.bellmedia.com, 2022, 4 pages.
Tong, "Can NFTs work for luxury jewellery?", Vogue Business, Jun. 21, 2021, 8 pages.

* cited by examiner

Data Repository (104)
Associates Jewelry and/or Gemstones with their Reference Signatures (and other data)
Digital Asset (170) (Links Jewelry/Gemstone with Reference Signature)

Server (102)
Processor (112)
Memory (114)
Registration/Authentication Code (116)
100
Marking System (130)
Sensor System (140)
Jewelry/ Gemstone (150)
Mobile Device (110)
Mobile Application (120)
Mobile Device (110)
Mobile Application (120)

SYSTEMS AND METHODS FOR RELIABLE AUTHENTICATION OF JEWELRY AND/OR GEMSTONES

CROSS-REFERENCE AND PRIORITY CLAIM TO RELATED PATENT APPLICATIONS

This patent application is a continuation of PCT patent application PCT/US23/23360, designating the United States, filed May 24, 2023, and entitled "Systems and Methods for Reliable Authentication of Jewelry and/or Gemstones", which claims priority to U.S. provisional patent application 63/345,747, filed May 25, 2022, and entitled "Systems and Methods for Reliable Authentication of Jewelry and/or Gemstones", the entire disclosures of each of which are incorporated herein by reference.

INTRODUCTION

There are tremendous technical challenges in the art for authenticating jewelry and/or gemstones. This is particularly problematic for the marketplace in jewelry and gemstones because the risk of fakes has the effect of acting as a drag on market volume and market pricing. This can be especially problematic at the high end of the market where the profitability of fraud has the tendency of attracting sophisticated forgers and fraudsters. The ever-present risk and fear of fakes creates pricing uncertainties that act to the detriment of both buyers and sellers.

While trusted jewelers, gemologists, and appraisers provide valuable services in connection with certifying and appraising the authenticity, quality, analysis, grading, and value of jewelry and/or gemstones, the supply of such trusted jewelers, gemologists, and appraisers is limited in relation to the volume of transactions with respect to jewelry/gemstones. In other words, there are simply not enough trusted jewelers, gemologists, and appraisers to keep up with the volume of transactions that occur in jewelry and gemstones (or could occur if the market were expanded as a result of introducing more trust into the transaction process).

Moreover, the negative impact arising from a lack of trust is particularly acute in connection with the market for sales of "limited editions" of jewelry/gemstones as well as the resale market for jewelry/gemstones (where the risks of fraud and fakes grow stronger the further removed the re-sold jewelry/gemstones are from a previous trusted assessment). How can a buyer trust that the allegedly "one of a kind" jewelry piece and/or gemstone that he or she wants to buy is truly the same "one of kind" item that is being offered or marketed to him or her?

Further still, even if there were a hypothetical world where a sufficient supply of trusted jewelers, gemologists, and appraisers existed who would be available to timely assess every jewelry/gemstone transaction (including resales), these assessments would still suffer from the inherent limits in the powers of human perception.

In an effort to mitigate these problems in the art, techniques have arisen for marking jewelry and/or gemstones with indicia that impart some level of uniqueness to the jewelry/gemstone. For example, a unique serial number or the like can be laser engraved, printed, or acid-etched on the jewelry/gemstone. However, this approach also suffers from a trust deficit as it is possible for a forger to copy the serial number on the "real" item and engrave, print, or etch it on a forged item (and then pass the forgery off as real). As such, the inventors believe that technical improvements are needed in the art that go beyond merely marking jewelry/gemstones with indicia.

Toward this end, the inventors disclose techniques for authentication of jewelry and/or gemstones that creates verifiable data about a particular piece of jewelry and/or particular gemstone that is sufficiently unique to the particular piece of jewelry and/or particular gemstone to serve as a reference signature for the particular piece of jewelry and/or particular gemstone. This reference signature can be stored in association with the particular piece of jewelry and/or particular gemstone, and a digital asset such as digital token, certificate, or file can be created for the particular piece of jewelry and/or particular gemstone, where the digital asset includes a link to the stored reference signature for the subject particular piece of jewelry and/or particular gemstone. This digital asset can be provided to the owner of the particular piece of jewelry and/or particular gemstone. During an authentication process, this digital asset can be used to access the stored reference signature, whereupon this reference signature can be used for making an assessment as to whether a particular piece of jewelry and/or particular gemstone is in fact the same particular piece of jewelry and/or particular gemstone for which the reference signature was created.

For enhanced reliability, the reference signature can be stored on a blockchain. Moreover, the digital asset can be a non-fungible token (NFT) that is minted for the particular piece of jewelry and/or particular gemstone, where the NFT includes a link to the reference signature stored on the blockchain. In this fashion, users of the authentication system can be alleviated about concerns with respect to potential tampering of the reference signature over time by bad actors. Because the blockchain serves as an immutable ledger that provides a reliable record regarding the verifiable data that serves as the reference signature, a reliable determination can later be made as to whether the particular piece of jewelry and/or particular gemstone being tested for authenticity is the same particular piece of jewelry and/or particular gemstone that was earlier used to create the reference signature.

In an example embodiment, the reference signature can be based on images of the particular piece of jewelry and/or particular gemstone. The verifiable nature of the reference signature means that the reference signature can later be compared with newly created data about the particular piece of jewelry and/or particular gemstone (e.g., new image-based data of the subject particular piece of jewelry and/or particular gemstone) during an authentication process. For example, such an authentication process can be performed at the time of (or preparatory to) a sale of the particular piece of jewelry and/or particular gemstone.

Further still, in example embodiments, the reference signature for the particular piece of jewelry and/or particular gemstone can be created by processing one or more images of the particular piece of jewelry and/or particular gemstone to extract a plurality of feature values for a set of features about the particular piece of jewelry and/or particular gemstone, wherein the extracted feature values serve as the reference signature. Furthermore, the set of features for which the feature values are to be extracted can be determined based on artificial intelligence (AI), machine learning (ML), and/or computer vision techniques. For example, an AI/ML system that is trained to recognize objects can be used as the basis for extracting features from images that are to serve as a model of the reference signature. As an example, the AI/ML system, which may take the form of a convolutional neural network (CNN), can be trained based on a plurality of known images of jewelry and/or gemstones to learn how to distinguish between different items of jewelry and/or gemstones based on their quantifiable characteristics as ultimately reflected in the set of features used for the reference signature. For example, these characteristic features may be based on the shape of the subject jewelry/gemstone, dimensions of the subject jewelry/gemstone, relative positioning of one or more points on the subject jewelry/gemstone relative to one or more other points on the subject jewelry/gemstone, indicia (e.g., codes) that may be marked on a surface and/or subsurface of the subject jewelry/gemstone, and/or other quantifiable characteristics, etc. The features included in the set of features can comprise features that are found by AI and/or machine learning (ML) techniques to, in the aggregate, correlate to distinguishing between different items of jewelry and/or gemstones from each other based on one or more defined performance metrics. In this fashion, the AI/ML techniques can identify and extract quantifiable and complex relationships between features of the particular piece of jewelry and/or particular gemstone for use in the reference signature that are imperceptible to humans and thus unavailable for use with conventionally programmed software that may be employed to recognize jewelry/gemstones. Accordingly, through the practical application of AI/ML-based image processing techniques as described herein to generate a reference signature for a particular piece of jewelry and/or particular gemstone, a computer system can be designed to do things it could not do before-namely, create a reliable reference signature that is useful for authenticating that a particular piece of jewelry and/or particular gemstone being evaluated is the same particular piece of jewelry and/or particular gemstone for which the reference signature was previously generated.

Further still, to impart additional layers of uniqueness on the particular piece of jewelry and/or particular gemstone, the particular piece of jewelry and/or particular gemstone can be marked with indicia. This indicia can be a code or pattern that is itself unique to the particular piece of jewelry and/or particular gemstone, or this indicia can be a code or pattern that provides uniqueness when combined with other features or characteristics of the particular piece of jewelry and/or particular gemstone. As an example, the indicia can be a QR code. As another example, the indicia can be laser engraved onto a surface and/or subsurface of the particular piece of jewelry and/or particular gemstone (although it should be understood that other marking techniques could be employed). Further still, the indicia can be suitably small in size, such as millimeter scale, micron sale, or even nanoscale. Moreover, it should be understood that the particular piece of jewelry and/or particular gemstone can be marked with multiple indicia if desired by a practitioner.

The inventors further disclose that the particular piece of jewelry and/or gemstone can be authenticated or assessed by a qualified or certified jeweler, gemologist, and/or appraiser contemporaneously with the creation of the reference signature to produce documentation that attests to the authenticity, nature, condition, quality, and/or grading of the particular piece of jewelry and/or gemstone (e.g., GIA certificates or the like). The reference signature can be associated with such documentation and stored together so that the reference signature and documentation can accompany the particular piece of jewelry and/or gemstone throughout its life, which can help alleviate the need for new assessments of the particular piece of jewelry and/or gemstone by qualified or certified jewelers, gemologists, and/or appraisers each time the particular piece of jewelry and/or gemstone is sold to a new buyer. For example, the accompanying documentation about the particular piece of jewelry and/or gemstone can also be stored on a blockchain in association with the reference signature to create an immutable record that can be used to establish the authenticity of the particular piece of jewelry and/or gemstone.

Thus, as an example embodiment, the inventors disclose a method for authenticating jewelry and/or gemstones, the method comprising: (1) creating a reference signature for an item, wherein the item comprises jewelry and/or a gemstone, (2) storing the reference signature in a memory in association with the item, and (3) authenticating whether a test item is the same as the item, wherein the test item comprises purported jewelry and/or a purported gemstone, wherein the authenticating step comprises (i) creating a test signature for the test item, (ii) accessing the stored reference signature that is associated with the item, (iii) comparing the test signature with the accessed reference signature to determine whether a match exists between the test signature and the accessed reference signature, wherein a determined match between the test signature and the accessed reference signature serves to authenticate the test item as being the same as the item, and wherein the creating, storing, and authenticating steps are performed by one or more processors. As noted above, the reference signature can be stored on a blockchain for enhanced reliability, and a digital asset such as a non-fungible token (NFT) can be created for the item, wherein the NFT includes a link to the reference signature stored on the blockchain. Furthermore, the item may be marked with indicia to ensure the uniqueness of the reference signature.

Further still, as another example embodiment, the inventors disclose a method for applying artificial intelligence (AI) to support authentication of jewelry and/or gemstones, the method comprising: (1) imaging an item to generate one or more images of the item, wherein the item comprises jewelry and/or a gemstone, (2) processing the one or more images to extract a plurality of feature values for a set of features about the item, wherein the extracted feature values characterize the item and serve as a reference signature for the item, the reference signature for use in a subsequent authentication of the item, (3) storing the reference signature, and (4) creating a digital asset for the item that is linked to the stored reference signature. As noted above, the set of features for which the feature values are to be extracted are determined based on an AI, ML, and/or computer vision system that is configured to recognize objects, Moreover, the item may be marked with indicia to ensure the uniqueness of the reference signature. Furthermore, a digital asset such as an NFT can be used as the mechanism by which the reference signature is accessed on the blockchain.

As yet another example embodiment, the inventors disclose a blockchain-based method for supporting an authentication of jewelry and/or gemstones, the method comprising (1) creating a reference signature for an item, wherein the item comprises jewelry and/or a gemstone, the reference signature for use in a subsequent authentication of the item and (2) minting a non-fungible token (NFT) for the item via a blockchain, wherein the NFT includes a link to the created reference signature that is stored on the blockchain as metadata for the NFT.

As still another example embodiment, the inventors disclose a method for applying artificial intelligence (AI) to support authentication of jewelry and/or gemstones, the method comprising: (1) accessing a stored reference signature for an item, wherein the item comprises jewelry and/or a gemstone, wherein the reference signature comprises a plurality of feature values for a set of features about the item, wherein the feature values are derived from previously sensed physical characteristic data about the item, (2) sensing a test item to generate sensed physical characteristic data about the test item, (3) processing the sensed physical characteristic data about the test item to extract a plurality of new feature values for the set of features, wherein the new feature values serve as a test signature of the test item, (4) comparing the test signature with the accessed reference signature, and (5) authenticating the test item as being the same as the item if the comparing indicates that the test signature matches the reference signature. As noted above, the set of features to use for the reference signature can have been determined based on an AI, ML, and/or computer vision system that is trained to recognize objects. As an example, the sensed physical characteristic data can comprise optical characteristic data derived from one or more images. Also, the one or more images from which the new feature values are extracted can be captured by a camera-equipped mobile device that executes a mobile application to coordinate the authentication process with a remote server.

The inventors also disclose systems and computer program products for carrying out any of the aforementioned methods.

These and other features and advantages of the invention will be described in greater detail below.

BRIEF DESCRIPTION OF THE DRAWINGS

FIG. 5 shows an example process flow where reference signatures are stored on a blockchain and where NFTs are minted for jewelry and/or gemstones, where the NFT metadata stored on blockchain includes reference signatures for the jewelry/gemstones.

DETAILED DESCRIPTION OF EXAMPLE EMBODIMENTS

Figure 1A:
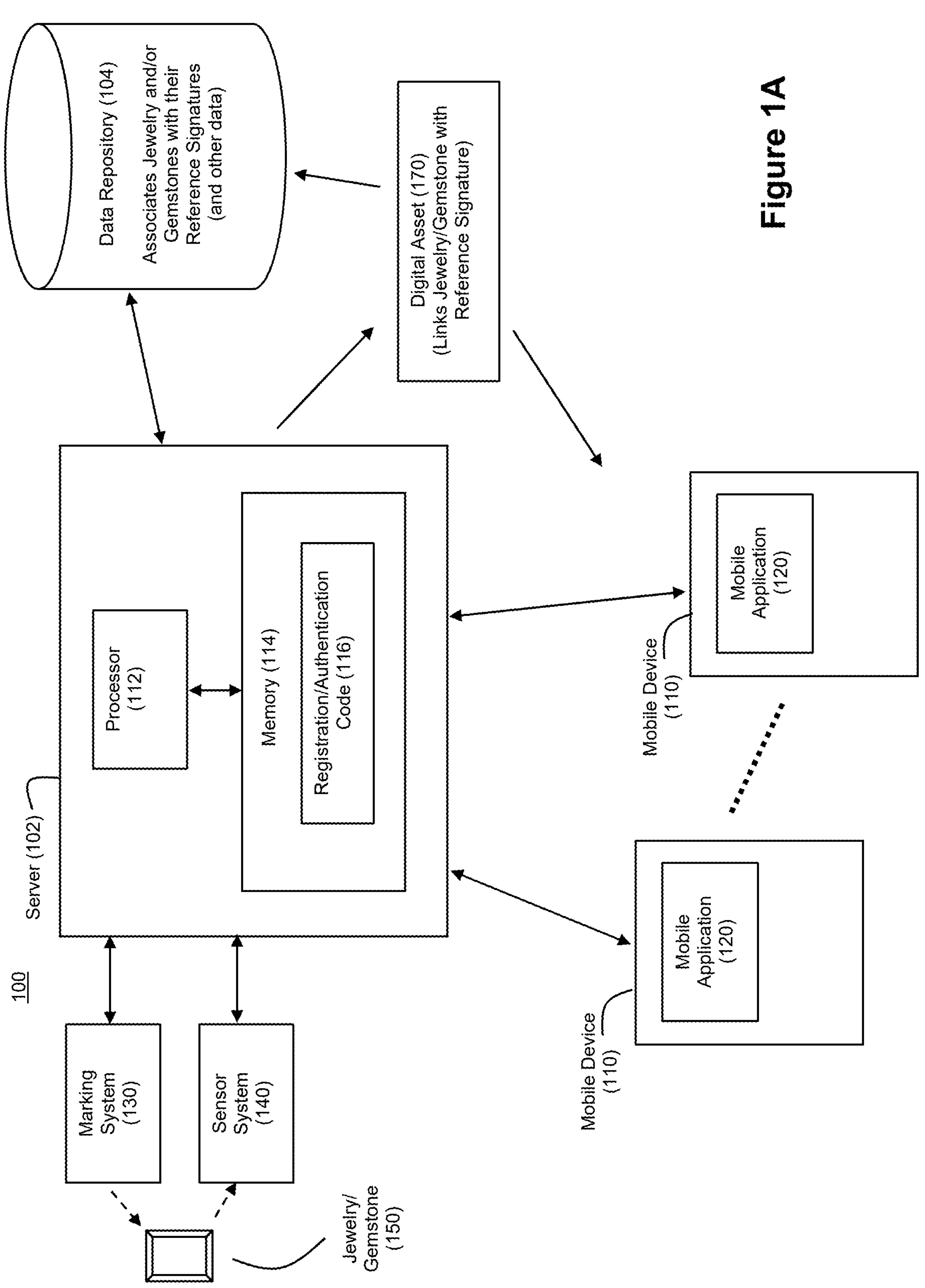
FIGS. 1A and 1B show examples of authentication systems that can be used as example embodiments.

FIG. 1A shows an example authentication system 100 for use in authenticating jewelry and/or gemstones to support trusted transactions in jewelry/gemstones. The system 100 includes a computer system 102 such as a server that provides registration and authentication services for jewelry and/or gemstones. In the example of FIG. 1A, the computer system 102 interacts with one or more data repositories 104, one or more mobile devices 110, one or more marking systems 130, and one or more sensor systems 140 as discussed below. These interactions can occur over one or more networks (e.g., the Internet, a wireless network, and/or other communication networks such as local area networks, etc.).

System 100 operates to provide authentication services for a particular piece of jewelry and/or gemstone (see 150 in FIG. 1A). The particular piece of jewelry and/or gemstone that is authenticated via system 100 can be referred to as an "item" 150 for ease of reference. As non-limiting examples, jewelry can take the form of rings, necklaces, chains, pendants, earrings, pins, bracelets, watches, or the like. Typically, jewelry will be formed at least in part from metal materials (e.g., precious metals such as gold, silver, platinum, etc.), although this need not be the case. As non-limiting examples, gemstones can take the form of diamonds, rubies, sapphires, emeralds, pearls, opals, onyx, jade, topazes, or the like (e.g., any Type A or Type B stone may serve as a gemstone). While gemstones are typically natural minerals, stones, or the like; this need not be the case. For example, the gemstones may take the form of synthetic minerals, stones, or the like. It may often be the case that jewelry and gemstones will be combined into single pieces (e.g., a ring, earring, necklace, pendant, etc. with one or more set gemstones). Any such instance of jewelry, gemstones, and/or combinations thereof may serve as the item 150.

A marking system 130 can be used to mark the item 150 with indicia that imparts uniqueness to the item 150. This uniqueness can arise from the indicia itself (e.g., the indicia can be a unique code that is marked on the item 150) and/or from the combination of the indicia with other characteristics of the item 150 (e.g., the nature of the indicia itself in combination with the location of the indicia on and/or distance of the indicia relative to other features of the item 150 can serve as a reference signature for the item 150).

In an example embodiment, the marking system 130 may comprise one or more computer-controlled laser engraving machines. A location on the item 150 can be selected, and the marking system 130 can be computer-controlled to precisely mark the selected location with the indicia. The size of the indicia marked onto the item 150 by marking system 130 can be very small. For example, the scale of indicia can be millimeter scale, micron scale, or even nanoscale. An example of a marking system 130 that could be employed for laser marking is a laser system available from Opsydia Ltd. of Oxfordshire, England that is capable of marking the subsurfaces of gemstones such as diamonds using laser pulses. However, it should be understood that the marking system 130 may take other forms, such as a printer capable of printing on jewelry and/or gemstones, a machine etcher capable of etching indicia onto jewelry and/or gemstones, computer-controlled acid etchers capable of etching indicia onto jewelry and/or gemstones, or even hand-operated acid or machine etchers capable of same.

The sensor system 140 operates to sense characteristics of the marked item 150 that can be used as a reference signature for the marked item 150. The sensor system 140 may employ one or more passive and/or active sensors. For example, the sensor system 140 may comprise a camera system that includes one or more cameras that image the marked item 150. The images can be still photographs and/or videos of the marked item 150. The reference signature can then be based on images of the marked item 150.

However, in other example embodiments, the sensor system 140 can use acoustical, electromagnetic, other optical, and/or other sensing techniques to sense characteristics of the marked item for use as the reference signature.

For example, the sensor system 140 can comprise an acoustic system that scans the marked item 150 with an acoustic signal (e.g., ultrasound) to generate an acoustic response from the marked item 150. It is expected that a data representation of such an acoustic response will be capable of serving as a reference signature for the marked item 150, particularly in example embodiments where the indicia is configured to impart unique acoustical characteristics onto the marked item 150.

As another example, the sensor system 140 may comprise an electromagnetic system that directs electromagnetic energy onto the marked item 150 to generate an electromagnetic response from the marked item 150. It is expected that a data representation of such an electromagnetic response will be capable of serving as a reference signature for the marked item 150, particularly in example embodiments where the indicia is configured to impart unique electromagnetic characteristics onto the marked item 150.

In still another example, the sensor system 140 may comprise a lidar system that scans the marked item 150 with laser light to generate a precise spatially three-dimensional (3D) depth map of the marked item 150. It is expected that a data representation of such a 3D spatial/depth map will be capable of serving as a reference signature for the marked item 150, particularly in example embodiments where the indicia is configured to impart unique 3D characteristics onto the marked item 150.

In still another example, the sensor system 140 may comprise a scanning electron microscope (SEM) that scans the marked item 150 with electrons to produce measurable signals that contain information about the surface topography and/or composition of the marked item 150. It is expected that a data representation of such signals will be capable of serving as a reference signature for the marked item 150, particularly in example embodiments where the indicia imparts topographical and/or compositional uniqueness onto the marked item 150.

In yet another example, the sensor system 140 may comprise a diffractometer that uses diffraction techniques (e.g., diffractometry) to produce measurable signals that contain information about the structural characteristics of the marked item 150. For example, X-ray diffraction (XRD) and/or X-ray crystallography techniques can be employed. It is expected that a data representation of such signals will be capable of serving as a reference signature for the marked item 150, particularly in example embodiments where the indicia imparts structural uniqueness onto the marked item 150.

The reference signature for the marked item 150 can be created by processor 112 based on information obtained from sensor system 140, and this reference signature can be stored by the system 100 in data repository 104 in association with other identifying information about the marked item 150. Data repository 104 can take the form of any system capable of storing data for access by the system 100, whether local data storage for the computer system 102 and/or remote/distributed data storage services (e.g., cloud storage). Further still, in some example embodiments as discussed below, the data repository 104 used for permanent storage of the reference signature may be one or more blockchains (e.g., see FIGS. 1B, 5, 6A, and 6B).

The system 100 can then create a digital asset 170 for the marked item 150, where the digital asset 170 links the item 150 with the stored reference signature for the marked item 150. This digital asset 170 can be a token, file, certificate, or other data object which contains or links to the reference signature for the marked item 150. This digital asset 170 can be provided to the owner of the marked item 150 as a trusted certificate that provides a basis for authentication of the marked item 150 as discussed below. In an example embodiment, the digital asset 170 take the form of an NFT 108 for the marked item 150 that includes a link to a blockchain record where the reference signature for the marked item 150 can be found (e.g., see FIGS. 1B, 5, 6A, and 6B).

The computer system 102 may comprise a processor 112 for cooperation with memory 114. Memory 114 can be a non-transitory computer-readable storage medium that stores code or instructions that are executable by the processor 112. For example, the memory 114 can store registration/authentication code 116 that the processor 112 executes to carry out the registration and authentication services described herein.

The processor 112 can take the form of one or more processors such as CPUs and/or other compute resources suitable for carrying out the processing operations described herein. Memory 114 can take the form of one or more memory devices, and it can store code for execution by processor 112 and/or other data structures for use by processor 112 during operation. Examples of memory 114 that can be used include random access memory (RAM), disk drive(s), or other suitable data storage devices. Moreover, memory 114 can be local to or remote from processor 112.

The code 116 for registering and authenticating jewelry/gemstones can be embodied by machine-readable code that is resident on a non-transitory machine-readable storage medium such as memory 114. The code 116 can take the form of software and/or firmware that define the processing operations discussed herein for execution by the processor 112. The code 116 can be structured in any of a number of different manners, such as in one or more applications or modules for execution by processor 112, including distributed execution of portions of code 116 by multiple processors 112. For example, a practitioner may employ different applications or modules for operations relating to registration of jewelry/gemstones versus operations relating to authenticating jewelry/gemstones as part of a transaction. Accordingly, it should be understood that any of the operations described below with reference to FIGS. 2, 4A, 4B, and 5 as part of code 116 could be performed by one or more computers that are remote each other. For example, the authentication system 100 can be a distributed computing system employed in a cloud environment.

Figure 2:
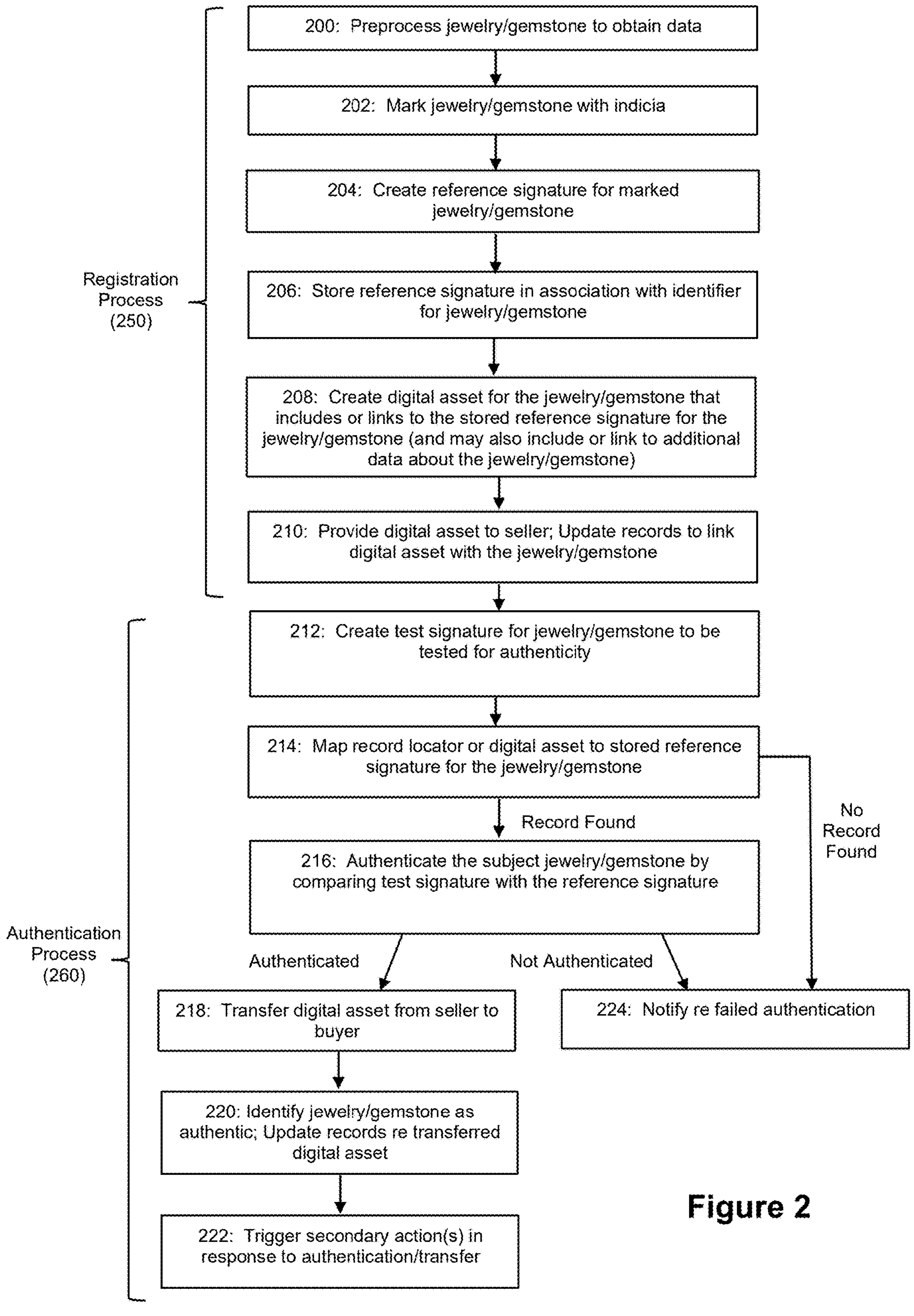
FIG. 2 shows an example process flow for authentication of jewelry and/or gemstones using the system of FIG. 1A or 1B.

In an example embodiment, the code 116 defines operations that relate to two primary operational phases for the system 100—a registration process 250 and an authentication process 260—as shown by FIG. 2.

FIG. 2 shows an example process flow that can be carried out by authentication system 100 to authenticate items 150. Generally, this process flow can be viewed as a two-phase process. The first phase is a registration process 250 where the item 150 is registered with the system 100 in a manner that supports reliable authentication of that item 150 at a later time. This registration process 250 is generally covered by steps 200-210 of FIG. 2. The second phase is an authentication process 260 where a transaction in the item 150 (e.g., a sale where a buyer purchases the item 150 from a seller) is supported through a verification that the item 150 that is the subject of the transaction is in fact the same item 150 that was registered with the system 100. This authentication process 260 is generally covered by steps 212-224 of FIG. 2. By following the process flow of FIG. 2, an example authentication system 100 can operate to create user profiles, link items 150 to associated user profiles, link items 150 and their reference signatures to digital assets 170, and authenticate transactions between sellers and buyers with respect to the items 150 on the basis of these reference signatures.

Step 200—Preprocessing of Jewelry and/or Gemstones

Step 200 of FIG. 2 involves preprocessing the item 150, which operates to obtain and/or produce background data about the item 150 that can contribute to establishing the veracity of the item 150. It should be understood that the extent of preprocessing performed at step 200 may vary depending on the needs and desires of a practitioner. For example, some practitioners may employ preprocessing to create minimal background data about the item 150 (e.g., a record locator for the item 150); while other practitioners may want to create extensive amounts of information about the item 150 (where examples of such information are discussed below).

As part of system setup, a user may register with the authentication system 100 to become a registered member. Registration can be completed by the user accessing the server 102 hosting the authentication system 100 through an accessible electronic device. These types of devices may include personal electronic devices such as computers, mobile phones, smartphones, or other wearable connective electronics. The authentication system 100 can then collect inputted information from the user related to identification of the user within the authentication system 100. Such user information may include name, address, inventory items, monetary account information, and/or crypto wallet information. The authentication system 100 may receive and record monetary account information related to both fiat currency and digital currency assets like cryptocurrency. Once a user account is created and stored within the data repository 104 of authentication system 100, the user can access the authentication system 100 for transactional activity of jewelry/gemstone items 150 stored and maintained within the authentication system 100.

Furthermore, the user account can also include identification data for the user. For example, this user identification data can be biometric data about the user, where this biometric data can serve to uniquely identify the user during transactions performed with respect to the authentication system 100. For example, the biometric data may include digital representations of a fingerprint for the user (e.g., a thumbprint), digital representations of the user's face (e.g., FaceID as used by Apple iOS devices), digital representations of the user's retina, or other personally identifiable and detectable user characteristics. However, in other examples, the user identification data can be a password that is known by the user. By including such user identification data in the user account, the authentication system in example embodiments can optionally provide multi-factor authentication for transactions performed with respect to the authentication system 100. In this regard, the user can be linked by the system 100 to a subject item 150 that he or she owns; and completion of transactions involving the subject item 150 can be conditioned not only on the subject item 150 being authenticated by the authentication system 100 but also conditioned on the seller of the subject item 150 being authenticated as the same user who is registered with the system 100 as being the owner of the subject item 150. This multi-factor authentication can reduce the risk of a thief who steals the subject item 150 from the true owner being able to sell the subject item 150 via the system 100 (because while the subject item 150 would be authenticated by the system 100; the thief would presumably be unable to pass the a user authentication test).

After registration, the user may then contact the server 102 of the authentication system 100 in an electronic format to notify the system of the user's desire to register an item 150 with the system in a manner that supports reliable and authenticatable sales of that item 150. To accomplish this, the user can present the physical item 150 as well as any accompanying information related to the item 150 to personnel associated with the system 100. Once received, the preprocessing of the item 150 can begin. For example, the personnel may perform assessments and/or appraisals of the authenticity, nature, condition, quality, value, and/or grading of the item 150 in order to generate data for use in documenting the state of the item 150 at the time of registration. However, it should be understood that the pre-processing and/or registration steps may alternatively be performed in a more peer-to-peer manner that need not involve personnel of the system 100 acting as a go-between between the buyers and sellers.

As an example, at step 200, the system 100 can link the item 150 with a record identification number that serves as a record locator for the item 150 in system 100. This record identification number can be provided by the owner of the item 150 or can be created by the system 100 as a unique serial number for each item 150 it registers. The record identification number of the item 150 can then be stored within the data repository 104 of the server 102 hosting the system 100 for association with other information about the item 150. The operators can also begin to store a file of information associated with the item 150 for holding information or documentation about the item 150. The file associated with the item 150 can be stored in an electronic format but may contain information obtainable in a physical medium. For example, a certified jeweler, gemologist, and/or appraiser may be one of the personnel who contributes data about the item 150 during the preprocessing step 200. Such personnel may grade the item 150 based on industry regulations and standards and enter such information into the server 102 for storage on the system 100 in association with the item 150. In some instances, the certified jeweler, gemologist, and/or appraiser may grade the item 150, perform an initial authentication of the item 150 and/or confirm that any previously issued or associated documentation, for example GIA certificates, are correct and match the item 150 to be registered with the system 100.

Some of this preprocessing information may be in a physical format as papers or certificates. Such physical items can be scanned, digitized, or recorded into a digital medium and then associated with the record identification number of the item 150. Much of this preprocessing information may be presented to the operators of the system 100 as digital files. These digital files may be manually authenticated by the certified jeweler, and they may also be added to the record identification number of the item 150. Some digital files may be associated with different components of the item 150 (e.g., a ring that includes a band and a set gemstone). For example, each component of the item 150 may have its own associated information/documentation. Some of the digital files associated with the item 150 that are to be obtained at step 200 may be contained within a blockchain. The system 100 could, through the use of APIs and/or blockchain protocols pull in off-chain data which is specific information related to the item 150. Examples of such information may include insurance policy information from an insurance provider, an appraisal from an appraiser, receipts for the original purchase of the item from a vendor, etc. Connecting through the appropriate API protocols, the system 100 could interact with this off-chain data to retrieve the requested information from a secure blockchain (or blockchains) and save such information in data repository 104 in association with the record identification number for the item 150. In other example embodiments, the system 100 itself may employ its own stored blockchain software application to connect to one or more associated blockchains and retrieve the requested information related to the item 150 and/or perform actions with other blockchains. Once retrieved, this digital information can be stored within the data repository 104 of the server 102 and associated with the record identification number of the item 150.

At step 200, the system 100 generally tries and attempts to build the most complete record for any and all information available to the system 100 about the item 150 to be authenticated. While many of these documents are generally associated with industry standard proper jewelry practices, a user of the system 100 may want to include more personal items in the record of the item 150. For example, a user of the system 100 may provide a narrative history for the item 150 or other information about the importance of the item 150 to the original owner, current, and/or past owner(s). In other instances, a user may provide images associated with the item 150 such as (but not limited to) engagement proposals, retirements, and other types of celebrations. Other possible identifiable information such as insurance policies may be provided to the system 100 for inclusion with the records associated with the item 150. In all, the operators of the system 100 may attempt to accommodate and digitize any request for information to be associated with the item 150 that is to be registered.

Further still, in some circumstances the owner of the item 150 may want to collect royalties from future sales of the item 150. This may be particularly the case when the owner is also the original creator of the item 150. For example, the owner may want to collect an X % royalty on all future sales of the item 150 for a defined amount of time in the future (or even in perpetuity). To accomplish this, the system 150 can associate the item 150 with a royalty clause or the like that can get embedded into the record for the item 150 in data repository 104 and ultimately included as a part of an NFT 108 for the item 150.

Once the record for the item 150 to be registered is completely digitized and recorded within the data repository 104 of the server 102, the system 100 can continue forward with the registration process 250 for the item 150.

Step 202—Marking the Jewelry/Gemstone with Indicia

At step 202, the item 150 is marked with indicia by marking system 130. As noted above, this indicia can help impart a high degree of uniqueness to the item 150, either based on its own inherent uniqueness or as a result of its combination with other characteristics of the item 150. In some instances, the item 150 may comprise both jewelry and a gemstone (e.g., a ring that includes a band and a set stone; earrings that include a set stone, etc.); and a practitioner may choose to mark more than one or all components of the subject item 150 with their own indicia. For example, in an instance where the item 150 includes a jewelry component and a single gemstone component, such item 150 could be marked so that Indicia 1 is marked onto the jewelry component and Indicia 2 is marked onto the gemstone component. In another instance where the item 150 includes a jewelry component and three gemstone components (e.g., a ring with three diamonds), such item 150 could be marked so that Indicia 1 is marked onto the jewelry component, Indicia 2 is marked onto the first gemstone component, Indicia 3 is marked onto the second gemstone component, and Indicia 4 is marked onto the third gemstone component. However, in other instances where the item has multiple components, a practitioner may find it desirable to only mark one of the components with indicia.

The indicia may be any type of identifier—e.g., an image, code, pattern, structure, or marking—that can be detected later during an authentication process. While such indicia may be perceptible to the naked eye, this need not be the case. The indicia can be extremely small so that indicia is not noticeable during normal viewing of the item 150 with the naked eye.

In an example embodiment, the indicia can be optically detectable indicia. However, this need not be the case. For example, the indicia can any type of indicia that would be detectable by any type of sensor system 140 employed by the system (examples of which are discussed above), such as acoustically detectable indicia, electromagnetically detectable indicia, etc.

As an example of optically detectable indicia, the indicia can be a QR code or other similar machine-readable indicia (e.g., a bar code, etc.). The computer system 102 can operate in conjunction with the marking system 130 to control the marking system to generate unique QR codes for use as the indicia so that the same QR code is not used to mark different items 150. This can be achieved through the use of programmatic control over the QR codes that are used by the marking system 130 for marking items 150. This programmatic control can be configured to guarantee the uniqueness of the different QR codes used as indicia (for example, by maintaining a database of all previous QR codes used for marking and making sure that a new QR code to be used for marking does not match a previous QR code used for marking); or it can be configured to make the QR codes highly likely to be unique (for example, by using random number generation (RNG) techniques and the like that would be capable of making the probability of creating the same QR code for different items extremely or even infinitesimally small). Not only are QR codes capable of being generated that serve as unique identifiers, but QR codes are also machine-readable within images to support automated data processing during the authentication process 260. Further still, QR codes can support operations that further supply data to potential owners/buyers. For example, a buyer scanning the QR code during a process of evaluating a potential purchase can trigger the display to the buyer of a wide variety of information linked by system 100 to the marked item 150. This information may include a short story or history related to the item 150. This information could also include information related to the supply chain of the item 150 detailing how it was obtained and possible certificates and authentications related to the item 150 itself. In other examples, scanning the QR code could execute an authorized giveaway prize by the seller or an automatic entry of the buyer into a sweepstakes or contest which may require purchase of the marked item 150.

To mark the item 150, the indicia may be engraved into or beneath a surface of the item 150. For an item 150 with both a jewelry component and a gemstone component, a practitioner may choose to mark both the jewelry component and gemstone component with indicia as noted above. Further still, while some practitioners may choose to mark both the jewelry component and the gemstone component with the same indicia; other practitioners may choose to mark the jewelry component and gemstone component with different indicia. Having different indicia on both the jewelry component and gemstone component further enhances the uniqueness of the item 150 and significantly increases the difficultly of faking the item 150 with a replica.

Furthermore, the location of the indicia on the item 150 may impart a degree of uniqueness for the marked item 150 that can later be used as part of the authentication process 260. For example, the spatial relationship between the location of indicia on the marked item 150 and one or more fiducials or reference points on the item 150 may be quantified and included as a component of the reference signature that can be used to help distinguish the marked item 150 relative to other jewelry and/or gemstones as it is expected that precisely replicating the location of indicia on a fake piece of jewelry/gemstone would be exceedingly difficult.

For jewelry, the indicia can be engraved on a surface the jewelry. The surface or surface location that is chosen for marking can be one that minimizes visibility of the indicia during normal wear (e.g., an inner surface such as along the inner circumference of a ring). However, this need not be the case. In some instances, the indicia may be marked on a subsurface of the jewelry.

For a gemstone, it is preferred that the indicia be engraved below a surface of the gemstone. It is expected that such subsurface marking will be more resistant to wear and tear over time and may be harder to replicate. However, for other example embodiments, a practitioner may choose to mark a surface of the gemstone with the indicia.

In some example embodiments, the indicia itself marked onto the item 150 may be two dimensional, but in other example embodiments, the indicia marked onto the item 150 may be three-dimensional. Such 3D indicia may be particularly useful for subsurface marking of gemstones. It is expected that 3D indicia will provide additional complexity that would be harder to replicate with fake jewelry and/or gemstones. In an example where a gemstone is marked with a 3D QR code, the depth of the code points can be varied within the gemstone while the width and length of the code points remain consistent. Thus, for at least one consistent viewing angle, the QR code can be positioned where it is scannable during the authentication process 260.

Also, as part of step 202, the computer system 102 can update the data repository 104 to associate its records about the subject item 150 to reflect the indicia that was used to mark the subject item 150. This can include storing a data representation of the indicia in association with a record identification number for the subject item 150.

Step 204—Creating a Reference Signature for the Marked Jewelry/Gemstone

After the item 150 has been marked with indicia at step 202, the sensor system 140 can be used to generate data about the marked item 150, and the computer system 102 can create a reference signature for the marked item 150 based on this generated data. As noted above, the sensor system 140 can rely on any of a number of different sensing modalities to generate reference signature data that are based on verifiable characteristics of the marked item 150 and which are sufficiently unique to the marked item 150 to support reliable authentication operations.

In an example where the sensor system 140 comprises a camera system, the reference signature can be based on images of the marked item 150 generated by the camera system. As noted above, these can be still photographs and/or videos of the marked item 150. Furthermore, such images may be three-dimensional images (e.g., depth images) of the marked item 150. The camera(s) used by the camera system may comprise one or more high resolution digital cameras on tripods or other support mechanisms. However, in other embodiments, given the high-quality cameras that are now employed on mobile devices such as smart phones, the camera system may take the form of a camera-equipped mobile device (e.g., a camera-equipped smart phone). In example embodiments where the images of the marked item 150 that are captured at step 204 are to include images of the marked indicia (which as noted above may be of a very small scale), the sensor system 140 may include magnification lenses capable of imaging indicia at high resolution even if the indicia is millimeter scale, micron scale, or nanoscale.

Figure 4A:
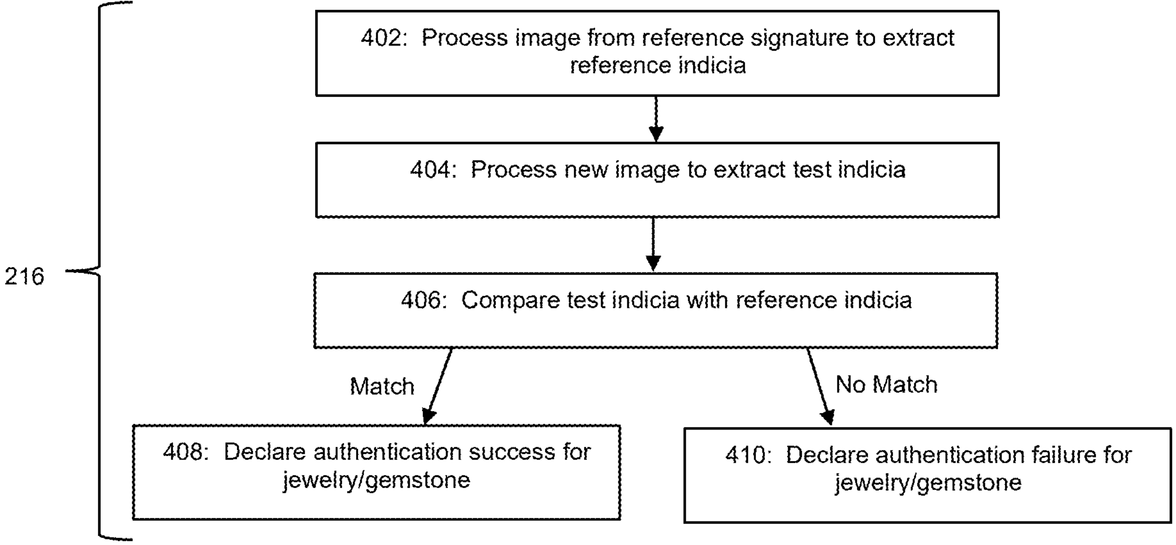
FIG. 4A shows an example process flow for authentication of jewelry/gemstone based on a reference signature that comprises an image of an indicia marked on the jewelry/gemstone.

In an example embodiment where the reference signature is based on one or more images of the marked item 150 (and where the marked indicia is optically detectable), the reference signature can be one or more images of the indicia as marked on the marked item 150 or even just a data representation of the indicia itself that has been marked onto the marked item 150. FIG. 4A describes an example technique for subsequent authentication based on such a reference signature. If the marked item 150 includes multiple components that are separately marked with indicia (e.g., a jewelry component marked with Indicia 1 and a gemstone component marked with Indicia 2), the reference signature can comprise multiple images of the marked item 150 such as an image of Indicia 1 on the jewelry component and an image of Indicia 2 on the gemstone component. In examples where the marked indicia is a QR code, the image(s) used as the reference signature can be image(s) of the QR code(s) on the marked item 150.

In another example embodiment where the reference signature is based on one or more images of the marked item 150, the computer system 102 can generate the reference signature from the images using AI, ML, and/or computer vision techniques where the images of the marked item 150 are processed to extract a set of feature values for characteristic features of the image. These feature values can then serve as the reference signature. It should be understood that any of a number of different features of the marked item 150 as depicted in the images captured by camera system can be used for the reference signature. The number of features can be small or large, with the expectation that using a larger number of features will enhance the reliability of the reference signature as a unique identifier for the marked item 150 but will result in a larger amount of data that will need to be stored and later evaluated as part of the authentication process 260. For example, the extracted feature values used as a reference signature for the marked item 150 can be a vector or matrix of many features (e.g., 10×10, 50×50, 100×100 matrices of feature values as examples). As discussed below in greater detail with respect to FIG. 4B, AI, ML, and/or computer vision techniques can be used to perform correlation analysis and/or causal analysis to identify features of the marked item 150 as depicted in the images that serve well for distinguishing similar but different items of jewelry and/or gemstones from each other. Step 204 can include computing values for these features from the images of the marked item 150, where these computed values can then serve as a reference signature for the marked item 150. In example embodiments, the computed values may be expressed as numeric weights. The images from which the feature values are extracted can include images that depict the indicia as marked on the item 150, including the location of the indicia relative to one or more fiducials on the item 150. One or more of the extracted feature values can then be derived from the indicia as marked on the item 150 in order to enhance the uniqueness of the marked item 150's reference signature.

To support such image processing and feature extraction, the camera system may take images of the marked item 150 from multiple perspectives/angles or create a composite of views of the marked item 150 from those angles/perspectives. For example, either a camera-equipped smart phone or a digital camera (e.g., an SLR camera) may be used to take a series of images of the marked item 150 in a dictated orientational loop. In other example embodiments, the camera system may record a video of the marked item 150 as the marked item 150 rotates or the camera system moves to capture a three-dimensional video of the marked item 150.

The image capture with the camera system can be a high-resolution scan of multiple faces/surfaces of the marked item 150. As part of the imaging by camera system at step 204, the camera system may project a light pattern (e.g., a dot pattern) onto the marked item 150 for purposes of feature extraction.

Step 206—Associating the Reference Signature with the Subject Jewelry/Gemstone At step 206, the system 100 stores data in a data repository 104 that associates the reference signature with the marked item 150. For example, a record in the data repository 104 about the marked item 150 be updated to link the reference signature for the marked item 150 with the record identification number (e.g., record locator) for the marked item 150. The data repository 104 for the stored data can be any suitable data repository, including but not limited to a local database of the server 102, a remote database, a third-party storage service (e.g., cloud storage), a blockchain network (e.g., where the stored data on an encrypted blockchain network as part of the hash), or others.

Step 208—Create Digital Asset for Jewelry/Gemstone that Contains or Links to the Reference Signature At step 208, the system 100 creates a digital asset 170 for the marked item 150, where this digital asset 170 contains the reference signature or includes a link to the reference signature. This digital asset 170 can be a token, file, certificate, or other data object which contains or links to the reference signature for the marked item 150. This digital asset 170 can be provided to the owner of the marked item 150 (see step 210) as a trusted certificate that provides a basis for authentication of the marked item 150 as discussed below. Further still, the digital asset 170 may contain or include links to other items of the stored data in the system's records about the marked item 150 that were generated during the preprocessing step 200 (such as certificates, GIA reports, supply chain histories, royalty clauses, and/or personal stories or anecdotes, etc.). By tying the digital asset 170 to this additional information, the seller can provide buyers with still more information about the marked item 150.

Figure 1B:
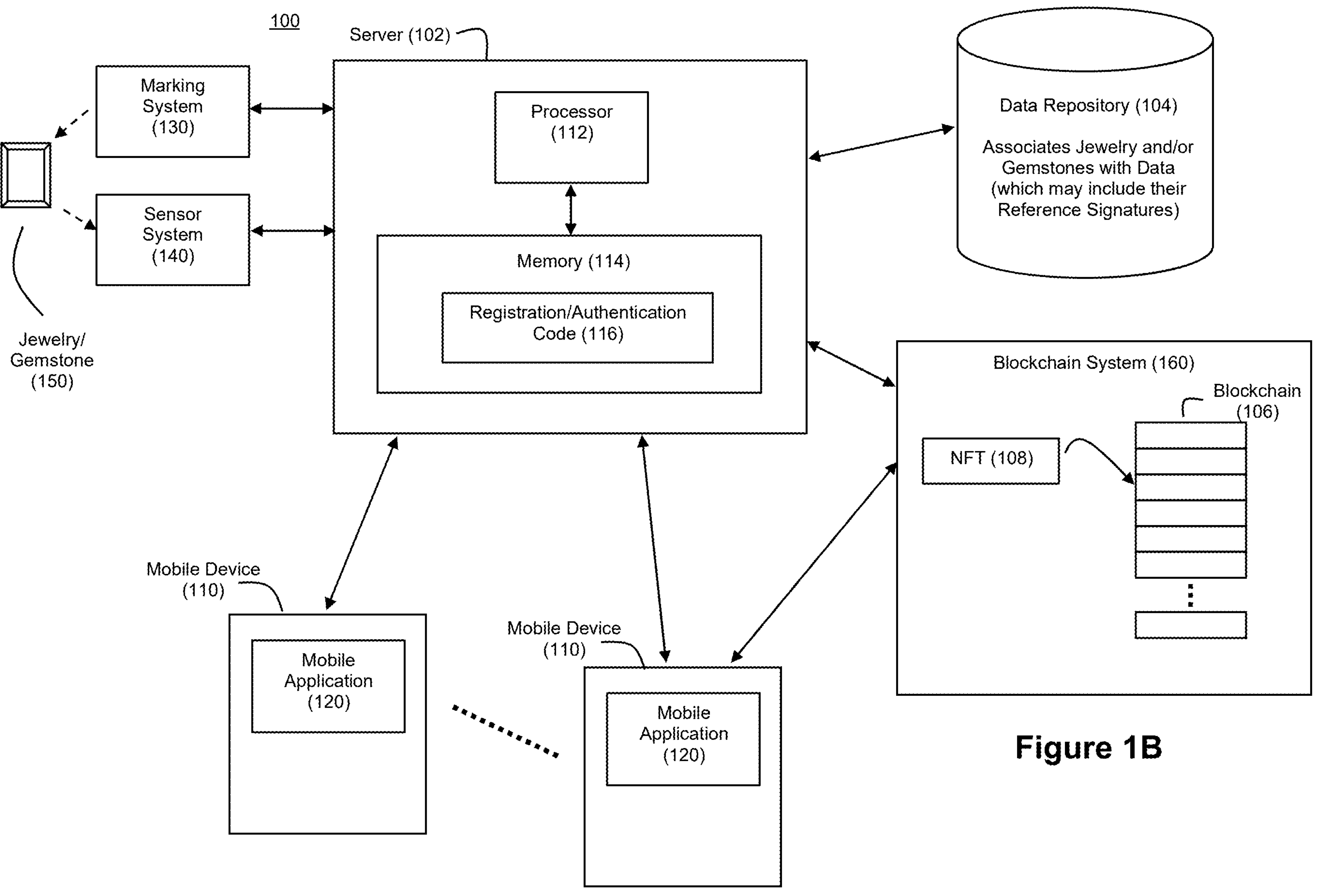

In an example embodiment, the digital asset 170 created at step 208 is a non-fungible token (NFT) 108. FIG. 1B shows an example system 100 in this regard. In connection with FIG. 1B, step 208 can interact with a blockchain network 160 to mint an NFT 108 for the marked item 150, and this NFT 108 can be provided to the seller of the marked item 150 (see step 210). The seller can then offer the marked item 150 for sale while using the NFT 108 as a trusted identifier for the marked item 150. As explained below, this NFT 108 includes the reference signature created by step 204 as part of the NFT's metadata. However, it should be understood that additional information about the marked item 150 may be included with the NFT metadata for the marked item 150 if desired by a practitioner (for example, any of the information generated/obtained as a result of step 200 and associated with the marked item 150 in data repository 104 could be included in the NFT metadata).

The minting process for the NFT 108 can be accomplished on a blockchain 106. In an example embodiment, the blockchain 106 can be locally operated by and connected to the authentication system 100. In this example embodiment, the authentication system 100 can be a centralized blockchain wherein the processor 112 of the authentication system 100 would execute the computing work to create the NFT 108 and also verify the proof of work associated with the minting process to add the newly minted NFT 108 to the existing hash. In other example embodiments, the blockchain 106 may be decentralized. This may be done by computing the necessary proof of work for hash additions through a plurality of additional members associated with the authentication system 100. In that manner, the blockchain 106 associated with the NFT 108 can be decentralized yet still quasi controlled by the authentication system 100 as members would be associated with the authentication system 100 itself. In other example embodiments, the blockchain 106 can be completely decentralized. The authentication system 100 could send out a call and interaction with a third party blockchain 106 to execute the minting process. Once initiated, the third party blockchain 106 could send the proof of work algorithm for the newly executed minting to a plurality of nodes associated and in communication with the third party blockchain 106. Once a consensus is reached within the plurality of nodes, the newly minted NFT 108 is added to the blockchain 106 as part of the hash. The consensus can be based on a predetermined threshold that is established by the authentication system 100.

The minting process for the NFT 108 can be executed through a normal minting process. However, the amount of information to be minted as the NFT 108 can be determined and authorized by the authentication system 100. FIG. 5 depicts an example process flow for an example minting process at step 208.

For example, at step 502, the authentication system 100 creates a file for the marked item 150 that will be submitted to the blockchain system 160 in order to mint the NFT 108. This file will include the reference signature. However, it should be understood that this file may also include additional information as noted above about the marked item 150 that a practitioner wants to include as part of the NFT's metadata (e.g., certificates, GIA reports, supply chain histories, royalty clauses, and/or personal stories or anecdotes, etc. as discussed above). Moreover, in example embodiments where the system 100 employs multi-factor authentication as discussed above, this additional information can include user identification data (e.g., user biometric data, a user password, etc.) for the user who is the owner of the subject item 150, where this user identification data can later be used as a second factor of authentication. Optionally, this user identification data can be encrypted prior to inclusion in the file. Moreover, this file may be aggregated from other files about the marked item 150 that are accessible by the system 100.

At step 504, the authentication system 100 submits a request to the blockchain system 160 to mint an NFT 108 based on this file. At step 506, the blockchain system 160 operates on this request and creates an immutable blockchain record for the file using cryptographic hashing techniques. In this fashion, the reference signature for the marked item 150 becomes stored on a blockchain 106 and becomes a highly reliable basis for subsequently authenticating the marked item 150. Similarly, if included as part of the file at step 502, the additional information can also become part of the immutable blockchain record. By adding such additional information to the immutable blockchain record, appraisals, assessments, etc. that were performed at step 200 can become permanently linked with the marked item 150 and thus accompany the marked item 150 through all future transactions, which further enhances the trust that can be established during future transactions without the need for re-engaging a qualified or certified jeweler, gemologist, or appraiser at the time of each future transaction. At step 508, the blockchain system 160 returns the minted NFT 108, where this NFT 108 includes a link to the blockchain record that contains the reference signature. Thereafter, the authentication system links the minted NFT 108 to its records in data repository 104 about the subject marked item 150 (see step 510; see also step 210 in FIG. 2). The minting process will thus operate to store the reference signature from the file on a blockchain 106 where it becomes an immutable record that the NFT 108 links to and which can be used for subsequent authentication of the marked item 150.

Figure 6A:
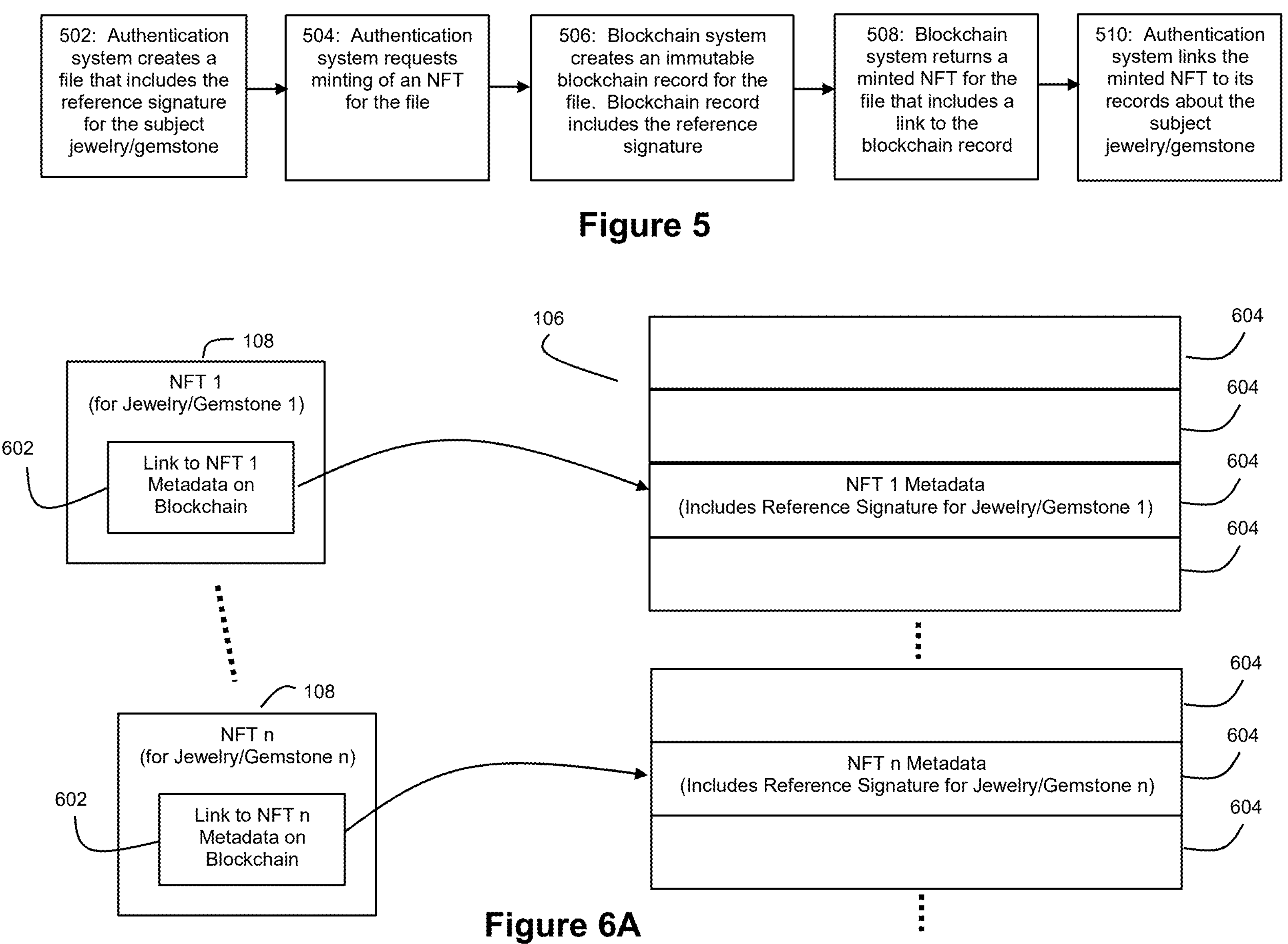
FIG. 6A shows an example set of NFTs with links to blockchain records where the reference signatures for jewelry/gemstones can be found.

FIG. 6A shows how the NFT minting process can operate to create blockchain records for different marked items 150. The blockchain 106 comprises a plurality of records 604 that serves as immutable entries in the blockchain ledger. An NFT 108 for a first item of jewelry/gemstone (see "NFT 1" for "Jewelry/Gemstone 1") will include a link 602 that points to the immutable blockchain record 604 where the metadata for "NFT 1" can be found (where this metadata includes the reference signature for "Jewelry/Gemstone 1"). The same process can be used to create an NFT 108 for another item of jewelry/gemstone (see "NFT n" for "Jewelry/Gemstone n"). This NFT n will include a link 602 that points to the immutable blockchain record 604 where the metadata for "NFT n" can be found (where this metadata includes the reference signature for "Jewelry/Gemstone n").

In other example embodiments, the seller/user may wish to add self-execution smart contracts to the minted NFT 108. For example, the contained self-execution smart contract could be a legal document showing valid transfer of ownership and which may include royalty clauses as discussed above. The self-execution smart contracts could also relay other legal rights back to the original owner or a previous owner of the marked item 150 for future authorized uses or self-execute updates to the original owner's insurance policy or coverage. Other self-executing contracts included as part of the NFT 108 could involve automatic entry of the wallet housing the NFT 108 in a sweepstake or raffle with prizes to be claimed at a later date when the wallet is verified to be owned by a specific individual. In other example embodiments, transfer of the NFT 108 will also self-execute transfer of additional NFTs or assets owned by the owner to the buyer if authorized.

If the authentication system 100 operates its own blockchain 106 for NFT creation, no additional fees or service fees may be charged for the minting process if so desired by a practitioner. Use of outside third party-operated blockchains as the blockchain 106 for the minting step 208 may involve payment of additional fees for the minting step 208 (e.g., some blockchain service providers may require a cryptocurrency minting fee, known as a gas fee, for the creating of the NFT 108, which may or may not be covered by the authentication system 100).

So long as the owner of the marked item 150 has a digital wallet, either hot or cold, the owner will be able to obtain the minted NFT 108. The authentication system 100 may place a call to the blockchain 106, centralized or decentralized, to create a token of the authentication file created and associated with the marked item 150. Within a centralized blockchain 106, the authentication system 100 may submit the minting of the authentication file to the blockchain 106 for verification and computation of the proof of work. Once the authentication file is minted as a token, the token may be placed within an authentication system wallet for later transfer to the wallet of the seller of the marked item 150. The gas fees for this minting process may be minimal so long as it is controlled by the authentication system 100. The minting process is relatively similar when using a decentralized blockchain 106 either controlled or uncontrolled by the authentication system 100. The authorization file is uploaded to be minted as an NFT 108 for later housing within an associated wallet. Gas fees may be paid by the authentication system 100 so that the plurality of nodes computing the proof of work to create the token are satisfied. These fees may later be passed onto the seller if the seller requests minting on a specific blockchain 106. Once a consensus is reached from the plurality of nodes confirming the NFTs creation, the token is created and added to the hash. The token can then be placed in the wallet of the authorization system 100 for later transfer to the seller of the marked item 150.

Step 210—Provide Digital Asset for Jewelry/Gemstone to Seller

At step 210, possession/ownership of the digital asset 170 is transferred to the seller of the marked item 150. This can be accomplished via emails, notifications, or other techniques for data transfer. The authentication system 100 can then update its records to reflect the digital asset creation and transfer to seller.

In examples where the digital asset 170 is an NFT 108, if allowed by the chosen blockchain 106, the newly minted NFT 108 can be directly associated with the seller's wallet if it is known and identified during the minting process. Otherwise, the authentication system 100 may have a holding wallet to contain all newly minted NFTs related to jewelry/gemstones, and the system 100 can then execute the appropriate call and codes to transfer ownership of the token to the seller's wallet for the NFT 108. Once accomplished, the current owner of the marked item 150 who may wish to sell that marked item 150 will have a digital token that can be used for authenticating the marked item 150. On the backend of the server 102, the authentication system 100 can update its records regarding the NFT creation. The server 102 can store within data repository 104 an identification of the newly created token to be associated with the record identification number for the marked item 150 that is already known by the system 100. The duality of numbers are interrelated with one another so that any future transactions involving the marked item 150 can easier be referenced and viewed against this set baseline. Once the newly minted NFT 108 is transferred, and the transfer is confirmed by consensus, the registration process 250 of the authentication system 100 is complete. From this point forward, the owner of the marked item 150 can offer the marked item 150 for sale knowing that the marked item 150 is authenticatable in a trusted manner using techniques as discussed below for authentication process 260.

In an example embodiment, the system 100 of FIGS. 1A and 1B can be operated as part of an e-commerce system where sellers register their respective jewelry/gemstones with the system 100 as distinct marked items 150 available for sale that are linked with their own respective digital assets 170. Buyers can then connect with the e-commerce system to find marked items 150 of interest for purchase to initiate trusted transaction processes where the actual marked items 150 can be authenticated using their associated digital assets 170 that contain or link to the reference signatures for the marked items 150. However, in other example embodiments, the system 100 can serve as a backend authenticator for jewelry/gemstones that are available for purchase from a seller, whereby a prospective buyer can use a digital asset 170 linked to an offered piece of jewelry/gemstone that has been registered with the system 100 as part of the authentication process 260 discussed below.

Step 212—Creating a Test Signature for Jewelry/Gemstone to be Tested for Authenticity As part of a trusted transaction where the seller seeks to sell the marked item 150 to a buyer, the purported marked item 150 can be newly processed at this time in order to create a test signature for the purported marked item 150 that can be used to verify that the purported marked item 150 being offered for sale is the same as the marked item 150 that had been registered with the system 100. For ease of reference, this purported item 150 can be referred to as the "test" item 150 or "test" jewelry/gemstone.

To create this test signature, the test item 150 can be subjected to the same or similar processes that were used at step 204 to create the reference signature. That is, the same or similar signature protocol that was used at step 204 to create the reference signature can be used at step 212 to create the test signature. A sensor system 140 can be used in this regard, and the sensing modality that is used can be the same sensing modality that was used to create the reference signature.

In an example embodiment where the reference signature is image-based, a camera can be used at step 212 to support the creation of the test signature by capturing one or more new images of the test item 150. The test signature can be created from these one or more new images. The same techniques that are used at step 204 to create the reference signature from one or more images of the marked item 150 can be used at step 212 to create the test signature from one or more new images of the test item 150.

In an example embodiment, the camera that is used to generate the new image(s) can be a camera used by the buyer, such as the camera on a camera-equipped mobile device 110 used by the buyer (e.g., a smart phone camera). With such examples, the mobile application 120 executed by mobile device 110 can process the new image(s) to generate the test signature; or the mobile device 110 can communicate the new image(s) to the computer system 102 for the computer system to translate the new image(s) into the test signature.

The mobile application 120 can be downloaded onto the mobile device 110 via an app store, a website for the authentication system, or other suitable network location. In an example embodiment, the buyer may be required to register with the system 100 as a user. This user registration process may include the buyer setting up a user profile to aid the authentication process 260. However, this need not be the case.

Step 214—Map Record Locator or Digital Asset for Jewelry/Gemstone to its Reference Signature At step 214, the system 100 receives or processes the digital asset 170 or a record locator for the test item 150 to locate and retrieve the reference signature that has been stored in association with the marked item 150. If a record locator is processed at step 214, this record locator can be scanned or otherwise obtained using retail or e-commerce techniques and then mapped at step 214 to the reference signature. If the digital asset 170 is processed at step 214, this digital asset 170 will contain or include a link to the relevant reference signature.

In an example where the digital asset 170 is an NFT 108, the retrieval of the mapped reference signature can be performed by accessing the link in the NFT 108 and interacting with the blockchain network 160 via this link to locate and retrieve the reference signature for the marked item 150 that was previously stored in a blockchain record associated with the NFT 108.

If the digital asset 170 or record locator cannot be mapped to a reference signature, then the authentication process 260 fails, and the buyer can be notified of this failed authentication (see step 224). This notification can occur via the mobile application 120. If the digital asset 170 or record locator is successfully mapped to the reference signature, then the process flow can proceed to step 216 where authentication is performed.

Step 216—Authentication of the Test Jewelry/Gemstone

At step 216, the system 100 compares the retrieved reference signature with the test signature to determine whether they sufficiently match with each other to declare the test item 150 as authentic.

In making this assessment, the authentication system 100 may have a variable threshold to determine whether or not there is a match depending on the circumstances. Thus, a tolerance can be built into the authentication step 216 so that slight variations between the reference signature and the test signature can still exist and be deemed t matches of each other, where these threshold/tolerances can be empirically set to balance the risk of false negatives while still avoiding unacceptable false positive rates.

To further authenticate the test item 150, step 216 may also pull and analyze additional information that has been linked to the marked item 150 via the digital asset 170 or records within the data repository (other than the reference signature), although this need not be the case. For example, as a second factor of authentication in an example where the additional information includes user identification data, step 216 can also perform a comparison between user identification data derived from the digital asset 170 and proffered user identification data supplied by a purported seller (test user identification data) to determine whether a match exists. Completion of a transaction can be conditioned on the seller of the test item 150 matching the owner of record as reflected by the digital asset 170.

If step 216 results in a determination that the reference signature does not match the test signature, the buyer is so notified in step 224 that the test item 150 has not been authenticated. But, if step 216 results in a determination that the reference signature matches the test signature, then the test item 150 can be declared authentic, and the process flow proceeds to step 218.

Figure 4B:
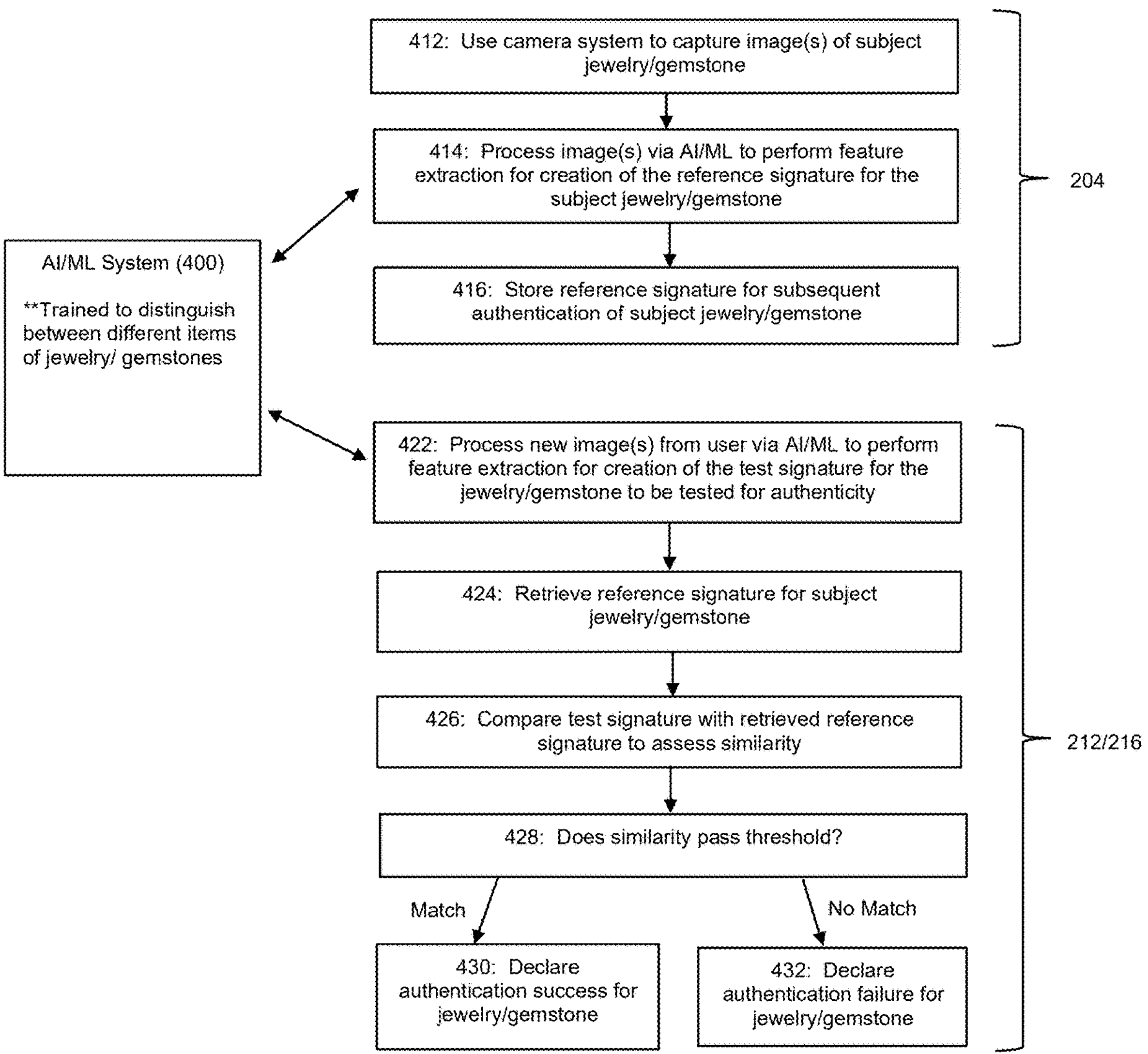
FIG. 4B shows an example process flow for AI/ML-driven image recognition operations for use in the creation of a reference signature and authentication of jewelry/gemstone based on such a reference signature.

FIGS. 4A and 4B show example process flows that include examples of how step 216 can be carried out for different types of reference signature.

FIG. 4A shows an example where the authentication in step 216 is based on a matching of the indicia used to mark the marked item 150 (the reference indicia) with indicia that is present on the test item 150 (the test indicia). In this example, the FIG. 4A process flow operates to authenticate a reference signature that comprises an image of the indicia used to mark the marked item 150. At step 402, the system 100 processes the image in the reference signature that includes the reference indicia as marked on the marked item

150 in order to extract the reference indicia depicted by that image. At step 404, the system 100 processes the new image of the test item 150 in a like manner to extract the test indicia depicted by that new image. In an example where the indicia is a code such as a QR code, steps 402 and 404 can operate to extract the codes used as the reference indicia and test indicia. At step 406, the system 100 compares the extracted test indicia with the extracted reference indicia. If they match, then the system 100 can declare that the test item 150 is authentic (step 408); if they do not match, then the system 100 can declare that authentication of the test item 150 has failed (step 410).

In this example, the comparison at step 406 may require a full match between the test indicia and reference indicia (e.g., where the reference indicia and test indicia are 50-digit codes; step 406 can require that each digit match each other in the reference indicia and test indicia).

Furthermore, in examples where the reference signature is simply the indicia itself rather than an image of the indicia, it should be understood that step 402 could be omitted.

Further still, the image processing at steps 402 and 404 can include the extraction of additional information about the indicia relative to the item 150 on which it is marked. For example, this additional information can be data that represents spatial or other relationships that exist between the indicia and the item 150 on which it is marked (e.g., distances relative to fiducials on the item 150). In such cases, step 406 can include comparing the additional information extracted at step 402 with like additional information extracted at step 404 to determine if they sufficiently match. Step 408 can then be made contingent on this additional information also being deemed a sufficient match. This additional layer of matching can help reduce the risk of fraud where a bad actor is able to copy the indicia (e.g., use the same code) on the fake item; but is unable to precisely replicate the relationship of the indicia to the marked item 150 that existed on the true item (e.g., positioning the indicia in the same precise spot on the fake item as it was positioned on the true item).

FIG. 4B shows an example embodiment where an AI/ML system 400 is used to facilitate the process of generating a suitable reference signature for the marked item 150, generating a suitable test signature for the test item 150, and then comparing the reference signature with the test signature as part of step 216.

In the example of FIG. 4B, steps 402, 404, and 406 can be used to implement step 204 from FIG. 2; and steps 412, 414, and 416 can be used to implement steps 212 and 216 from FIG. 2.

The AI/ML system 400 can be trained to distinguish between different items of jewelry/gemstones. This training can take the form of supervised learning, semi-supervised learning, or unsupervised learning. As an example, the AI/ML system 400 can take the form of a convolutional neural network (CNN) that is trained with large numbers of known images of different items of jewelry/gemstones to facilitate the identification of which features among a large set of features serve to reliably distinguish the different jewelry/gemstones from each other. The CNN can include a number convolution layers and sub-sampling layers (e.g., max pooling layers, averaging layers) that operate together to identify features and feature weights that can be used to establish a signature for a particular piece of jewelry and/or particular gemstone. As an example, the CNN can be a deep learning CNN. However, it should be understood that the AI/ML system 400 need not be a CNN. For example, the AI/ML system 400 could be a Generative Adversarial Network (GAN) or it could employ other computer vision techniques.

The features included in the feature set for the reference and test signatures can be selected from a large and virtually limitless number of features. Any feature that serves to quantify a characteristic of an image that depicts a particular piece of jewelry and/or particular gemstone can potentially be included among the feature set. Moreover, because jewelry/gemstones are 3D articles, at least some of the features in the feature set can represent 3D characteristics of the jewelry/gemstone. For example, the features in the feature set may include features that characterize a slope on a face of a gemstone, features that characterize indentations that exist on a ring band, etc. To support the quantification of such 3D features, the images from which the reference and test signatures are derived can include 3D depth images of the subject jewelry/gemstone as noted above (possibly enhanced by lidar if desired by a practitioner). Further still, in example embodiments where the subject jewelry/gemstone is marked with indicia (such as a QR code), the feature set can include one or more features that are based on aspects of the indicia itself and/or the relationship of the indicia to the jewelry/gemstone on which it is marked (e.g., data that indicates the location of the indicia on the jewelry/gemstone, where such location can be indicated in a virtually limitless number of ways, such as distances from quantified fiducials on the jewelry/gemstone).

In an example embodiment, features that in the aggregate are found by the AI/ML system to be sufficiently correlated with uniquely identifying a particular item of jewelry/gemstone can be included among the set of features used as the reference signature. These features can thus define a model for the reference signature. Practitioners can establish defined correlation, model fitting, and/or other performance metric thresholds that can be used for this determination (e.g., correlation values in a range between 0.51 to 1.00 or some other range deemed suitable by a practitioner). Further still, features whose feature values across the different training images exhibit a sufficiently low variance can be eliminated from eligibility for inclusion in the feature set to be used as a model for the reference signature. Practitioners can establish defined variance thresholds that can be used for this determination (e.g., a feature's feature values must exhibit a variance above a defined threshold across the different training images to be eligible for inclusion in the feature set).

Moreover, as part of the process of imaging the item 150 during the registration process 250 to create the reference signature and imaging the test item 150 during the authentication phase 260 to create the test signature, a camera can be used to project a pattern onto the item 150 (e.g., a dot pattern) to support the extraction of suitable features to characterize the subject item 150.

Returning to FIG. 4B, at step 412, a camera system is used to capture one or more images of the subject item 150. In an example embodiment, the camera system can generate these images from a plurality of angles to capture views of the item 150 from multiple perspectives. This can be accomplished by moving the camera system while imaging the item 150 and/or by moving the item 150 while imaging it with the camera system. As noted, the sensor system 140 may project a pattern (such as a dot pattern) onto the item 150 to support the subsequent feature extraction process. Moreover, the images created by the camera system at step 412 can be a 3D depth map of the subject item 150. As noted above, the images can be still images or video images of the subject item 150. In examples where the item 150 has been marked with indicia, one or more of these images should depict the indicia on the marked item 150.

At step 414, the one or more images captured at step 412 are processed to perform feature extraction with respect to the feature set for the reference signature model identified by the AI/ML system 400 for use in the reference signature of the subject item 150. This extraction results in the computation of feature values for the features of the feature set, where the reference signature for the subject item 150 can comprise these feature values. These computed feature values can be represented as one or more vectors or matrices of numbers that serve as the reference signature. Step 414 can be performed by processor 112 in cooperation with the AI/ML system 400, where AI/ML system 400 may be remote from the processor 112. As noted above, the feature set may be a large set of features identified by the AI/ML system 400.

At step 416, the reference signature created at step 414 can then be stored for later use during the authentication phase 260 for the subject item 150 (e.g., see discussions above for steps 206 and 208 of FIG. 2; see also FIGS. 5, 6A, and 6B).

Further still, a practitioner may choose to encrypt the reference signature, where the encrypted reference signature is the signature that gets stored for later use (e.g., stored on a blockchain 106 in some embodiments). The digital asset 170 that is created at step 208 can include the decryption key for the encrypted reference signature or a link to such decryption key.

Moreover, the storage at step 416 may take the form of distributively storing a plurality of segments of the reference signature across one or more blockchains 106 (see FIG. 6B) or other storage locations. In such a case, the digital asset 170 such as the NFT 108 can include a link to the distributively stored reference signature segments among its metadata. As part of such distributed storage, the reference signature can be divided into these segments, and these segments can be encrypted. The encrypted segments are then distributively stored across the one or more blockchains 106, and one or more decryption keys for the encrypted segments can be included as metadata in the digital asset 170 such as the NFT 108.

For the authentication phase 260, step 422 operates to process one or more new images from a user to perform feature extraction with respect to the feature set for the reference signature model identified by the AI/ML system 400 for use in the test signature of the test item 150. This extraction results in the computation of new feature values for the features of the feature set, where the test signature for the test item 150 can comprise these new feature values. The one or more new images processed at step 422 can be obtained by a camera-equipped mobile device 110 that executes the mobile application 120. In an example embodiment, the mobile device 110 can provide these new images to the computer system 102 whereby the processor 112 in cooperation with the AI/ML system 400 performs step 422. However, in another example embodiment, the mobile application 120 executed by the mobile device 110 can perform step 422 in cooperation with the AI/ML system 400.

At step 424, the reference signature is retrieved from storage (which may be one or more blockchains 106 if desired by a practitioner). This step 424 can be performed by processor 112 or mobile device 110 depending on how a practitioner has configured the system 100. The digital asset 170 for the subject item 150 (such as an NFT 108) can be the trigger for the retrieval of the reference signature at step 424.

At step 426, the test signature created at step 422 is compared with the reference signature retrieved at step 424. If the test signature matches the reference signature, the subject jewelry/gemstone 150 being tested can be identified as authentic. Likewise, if the test signature does not match the reference signature, the subject jewelry/gemstone being tested can be declared inauthentic. A practitioner can configure step 426 such that a 100% match is not required between all feature values of the reference and test signature. For example, the system 100 may support some level of tolerance in one or more of the feature values of the test signature relative to the reference signature while still declaring that a match exists.

Step 426 can be performed by processor 112 or mobile device 110 depending on how a practitioner has configured the system 100.

Figure 6B:
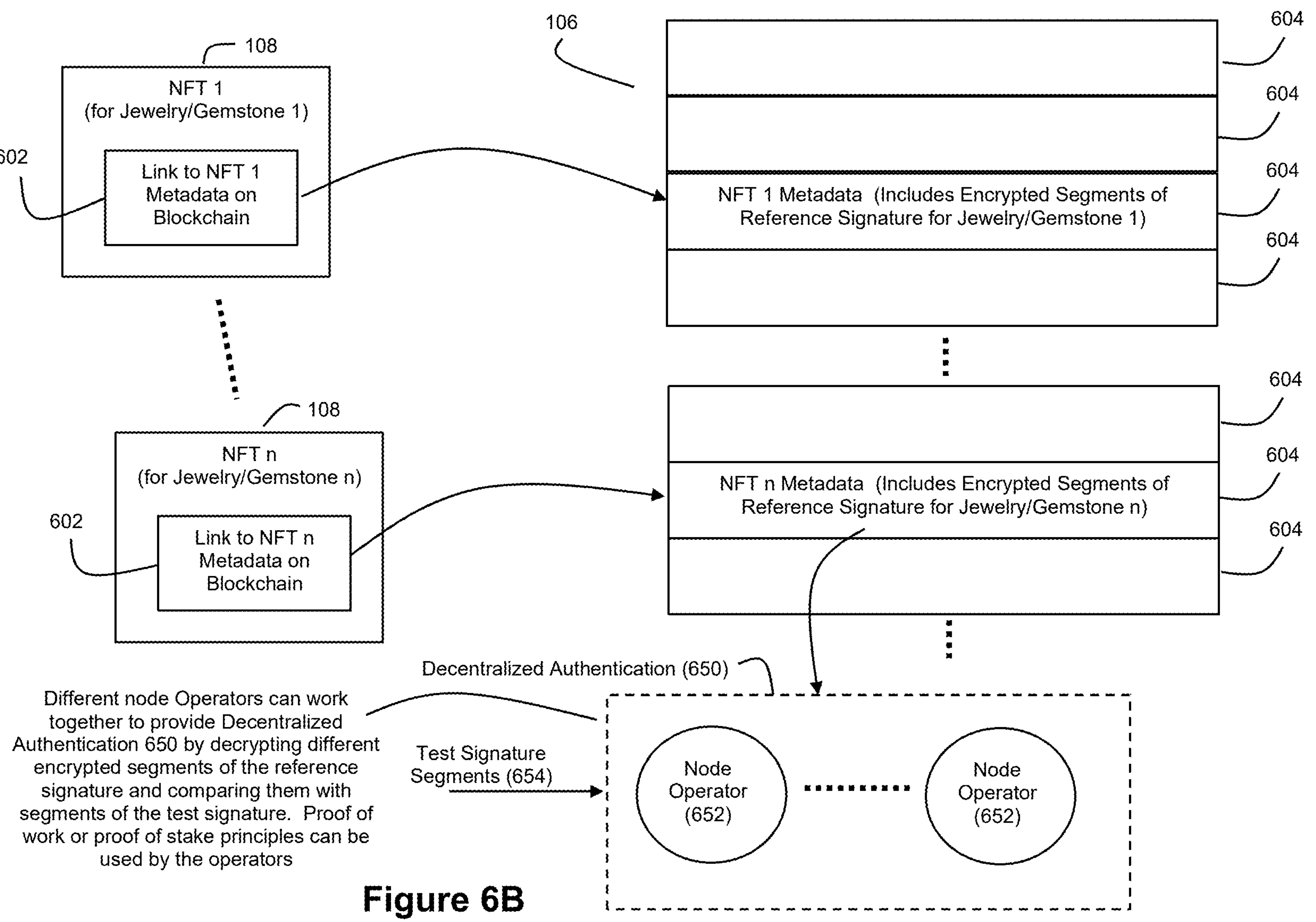
FIG. 6B shows an example set of NFTs with links to blockchain records where the reference signatures for jewelry/gemstones can be found and where the blockchain records are used in combination with a decentralized authentication service.

Moreover, if desired by a practitioner to enhance the trust of step 216, step 216 can be a decentralized authentication 650 as shown by the example of FIG. 6B. With this approach, different node operators 652 can operate on different segments of the reference signature to decrypt respective encrypted segments of the reference signature and compare them with corresponding segments of the test signature. If a consensus can be reached by the node operators that a significant number of the segments match, then the test item 150 can be declared authentic. Proof of stake and/or proof of work principles can be used by the node operators 652 as part of the decentralized authentication 650. As an example, the decentralized authentication 650 can employ secure multi-party computation (SPMC). With SPMC, each node operator 652 can operate on a different portion of the reference signature. In an example where the reference signature comprises a plurality of feature values derived from AI/ML, each node operator 652 can operate on different subsets of those feature values. In this way, the node operators 652 only have access to pieces of the reference signature and none of the node operators 652 have access to the entire reference signature, which helps enhance the security of the system 100. Moreover, if desired by a practitioner, the decentralized authentication 650 can employ a zero-knowledge protocol with zero-knowledge proofs of the verification and authentication tasks.

Step 218—Transfer Digital Asset for Purchased Jewelry/Gemstone

In response to authentication of the test item 150 at step 216 (which confirms that the test item 150 is the same as the marked item 150 that was initially registered with the system), the system 100 performs step 218 which transfers possession or ownership of the digital asset 170 to the buyer.

In example where the digital asset 170 is an NFT 108, as part of this process, the buyer (who is now registered on the authentication system) can provide the authentication system information regarding the associated wallet he or she would like to use for storage of the NFT 108. If the blockchain 106 is centralized and operated by the authentication system 100, a wallet may be automatically created and assigned to the buyer when the buyer registers with the authentication system 100. If a third-party chain or decentralized chain is requested by the buyer, the buyer would then provide the wallet he or she wishes to use to hold the token associated with the item 150. To transfer the NFT 108 from the seller to the buyer, a few different operations are envisioned for execution by the authentication system 100. With use of a centralized blockchain 106 associated with the authentication system 100, the NFT 108 originally associated with the seller and the record identification information may be burned and a new NFT 108 minted with the same information including the transaction information between the buyer and the seller (see, for example, the FIG. 5 process flow). Once minted, the new NFT 108 may be housed in the buyer's identified wallet. Gas fees in such and embodiment will be minimal and absorbed by the authentication system 100. If the buyer wishes to transfer the ownership of the NFT 108 to another blockchain to which the buyer's wallet connects, the authentication system 100 can do so. In this situation, the original NFT 108 associated with the seller is burned and a new NFT 108 associated with the buyer is minted containing all of the information and metadata which existed on the original NFT 108 as well as the addition of the transactional information. Once the proof of work confirms the transfer, the original NFT 108 is destroyed while the new NFT 108 becomes attached at the end of the hash. In some embodiments, the original NFT 108 itself will not be destroyed but only transferred between the buyer and seller. In these embodiments, possible smart contracts (such as royalty payment clauses) may follow the NFT 108 throughout its transfer. In this type of setting, it may be more advantageous to keep the original NFT 108 while transferring ownership between the seller and the buyer.

Furthermore, in an example where the NFT 108 is also linked to user identification data for the owner of the item 150, the transfer of the NFT 108 to the user can include linking the transferred NFT to user identification data for the buyer that is stored on the blockchain 106. In doing so, the blockchain 106 and NFT 108 can reflect the buyer as the owner of the item 150. As noted above, this transfer of the NFT 108 can involve changing the metadata to which the NFT 108 is linked (e.g., using a dynamic NFT (dNFT)) or burning the old NFT and creating a new NFT 108 for the buyer.

Step 220—Update Authentication System Records

At step 220, the authentication system 100 updates its internal records stored within its data repository 104. The record identification number associated with the marked item 150 is transferred in the internal databases of the authentication system 100 between the seller's account and the buyer's account. In some instances, a new record identification number may be randomly generated and assigned to the marked item 150. Also moved or reassigned within the database is any metadata or ancillary data provided from the seller. The buyer's record identification number associated with the marked item 150 would include the earlier information received by the seller and any additional information the buyer would like to add to the database. The digital asset 170 associated with the marked item 150 is then either transferred and recorded within the data repository 104, or the new digital asset 170 associated with the buyer is recorded within the data repository 104. The authentication system 100 then updates all accounts accordingly to confirm and record the transfer of the marked item 150 between the parties.

Step 222—Authentication System Executes Secondary Action(s)

At step 222, the system 100 triggers any secondary actions that are coded or requested by the buyer or seller. For example, the buyer and/or seller may authorize that any currency, fiat or crypto, be held in an escrow account until the transaction is verified by the authorization system 100. In such an example, the authentication system 100 would then execute and authorize the release of the currency to the seller's account or wallet in response to a determination that the test item 150 has been deemed to be authentic. Furthermore, the authentication system 100 could execute digital gifts or sweepstake entries at this point in the authentication process for the buyer if those items were included with the transaction. After all secondary actions are executed and confirmed, the transaction and authentication process is deemed complete. The authentication system 100 now stores the record identification number to correspond to the buyer for possible future transactions. Any digital asset 170 (e.g., NFT 108) associated with the marked item 150 is now also associated with the record identification number of the marked item 150 and now in the buyer's possession within the authentication system 100. From this point forward, the buyer is viewed as the owner of the marked item 150 and any accompanying documentation such as the digital asset 170.

In examples where the indicia on the marked items 150 are machine-readable codes such as QR codes, these indicia can encode the additional secondary actions that are to be performed when the test item 150 is successfully authenticated. Thus, when the indicia is scanned/imaged during the authentication process 260, the system can determine one or more secondary actions to perform as discussed above based on the actions encoded for the indicia.

FIG. 2 thus shows an example process flow that can implemented by system to authenticate a transaction involving a particular piece of jewelry and/or particular gemstone. It should be understood that FIG. 2 is just an example and other sets or sequences of steps can be performed to authenticate an item 150 using blockchain and NFT technology if desired by a practitioner.

Figure 7:
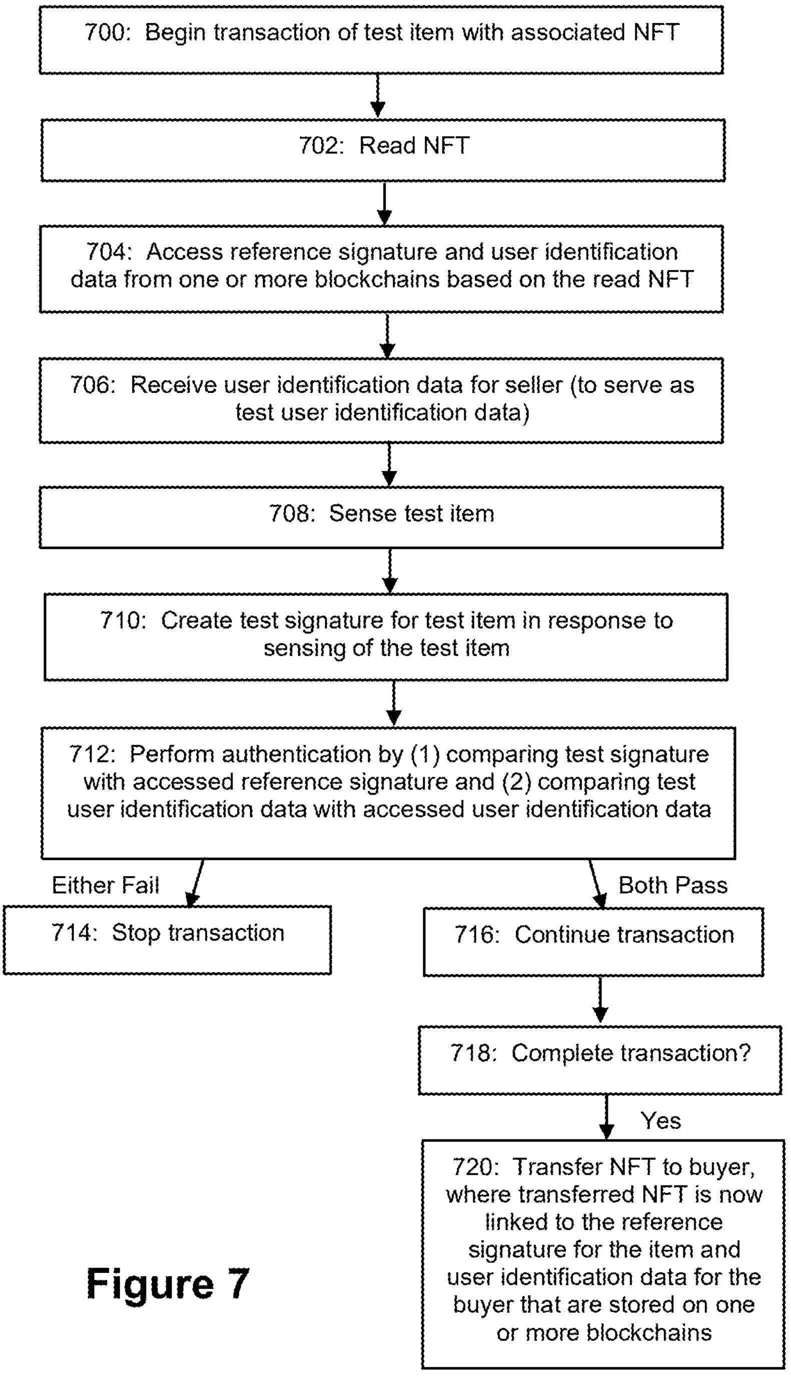
FIG. 7 shows an example process flow for an example authentication system with respect to carrying out a transaction of an item of jewelry and/or gemstones that purports to be authentic.

For example, FIG. 7 shows an example process flow for an example authentication system 100 with respect to carrying out a transaction of an item of jewelry and/or gemstone(s) that purports to be authentic.

At step 700 of FIG. 7, a transaction begins where a seller attempts to sell a subject item to a buyer. This subject item serves as the test item for the authentication process. This test item is purported by the seller as being the authentic item 150 that has been registered with the authentication system 100 (see registration process 250 discussed above). This test item will have an associated NFT as discussed above. At step 702, this NFT is read, which allows the authentication system 100 to access the reference signature and user identification data that are stored on one or more blockchains 106 (see step 704). This access can be based on linkage read from the NFT at step 702. In an example where the reference signature and/or user identification data are stored on the blockchain in an encrypted format, step 704 can also include decryption of the reference signature and/or user identification data as appropriate.

At step 706, the authentication system 100 receives user identification data from the seller. This received user identification data serves as test user identification data for the transaction to assess whether the seller is the owner of record for the subject item. The user identification data can be received from the seller via any of a number of manners. For example, the test user identification data can be provided by the seller as input via a mobile application 120 executed by a mobile device 110, where the mobile application 120 communicates with server 102. The user identification data from the seller can take any of a number of forms such as biometric data, passwords, etc., as noted above.

At step 708, the test item is sensed to generate characteristic data of the test item for use in a test signature for the test item. At step 710, this characteristic data is used to create the test signature for the test item. Steps 708 and 710 can be carried out by the authentication system 100 using the same techniques that were used during the registration process 250 to create the reference signature for the true item 150.

As noted above, any of a number of different sensing techniques (e.g., optical, acoustical, electromagnetic, etc.) can be used to generate the characteristic data; and techniques such as AI/ML can be used to decide on the features that will serve as the test signature (which will be the same features that serve as the reference signature).

At step 712, the authentication system 100 performs multi-factor authentication which (1) compares the test signature from step 710 with the accessed reference signature from step 704 and (2) compares the test user identification data from step 706 with the accessed user identification data from step 704. If either of these comparisons fail to produce a match, then the process flow can stop the transaction at step 714. This could arise due to (1) the test item not being deemed the true item 150 according to the reference signature and/or (2) the seller not being deemed the true owner according to the test user identification data. If both of these comparisons produce a match, then the process flow can continue the transaction (see step 716).

The authentication at step 712 can use any of the authentication techniques discussed above. For example, authentication at step 712 may comprise decentralized authentication 650 by a plurality of node operators on one or more blockchains; for example using SPMC techniques.

Presuming the transaction continues at step 716, the system 100 checks whether the transaction has been completed at step 718. Any of a number of requirements may be in place for completing the transaction. For example, completion of the transaction may be further contingent on the buyer fully paying the seller for the authenticated item. Once the transaction has successfully completed, then the NFT 108 can be transferred to the new buyer at step 720. The transferred NFT 108 can include a link to user identification data for the buyer that gets stored on the one or more blockchains 106 so that the transferred NFT 108 reflects the buyer as the new owner of the subject item. As discussed above, this NFT transfer can be accomplished by any of a number of techniques such as dynamic NFT techniques or burning the old NFT of the seller and minting a new NFT for the buyer (where the new NFT links to the reference signature for the subject item and the buyer's user identification data which are stored on the one or more blockchains 106).

Figure 3:
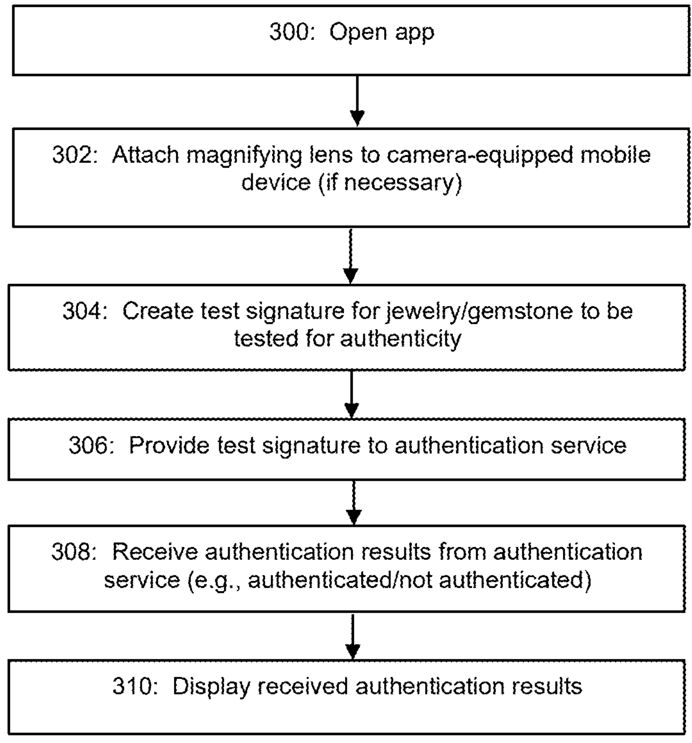
FIG. 3 shows an example process flow for a mobile application that participates in the authentication process of FIG. 2.

Mobile Application for Interacting with the Authentication System:

FIG. 3 shows an example process flow for the mobile application 120. The mobile application 120 can be stored locally on the mobile device 110 of the buyer. However, it should be understood that the system 100 may also or alternatively connect with web applications executed on desktop or laptop computers that carry out the same or similar operations as those shown by FIG. 3 for a mobile application 120. In either respect, the buyer of the test item 150 can register an account with the authentication system 100 to complete and confirm the transaction for the test item 150.

At step 300, the buyer will open the mobile application 120 on their mobile device 110 or through a landing page housed on the web. The mobile application 120 could be available for download from known application stores or from the internet. From there, the mobile application will prompt the buyer with a series of steps and actions to be completed to execute the authentication process 260. At step 302, if the test signature is based on images of the test item 150, the user of the mobile application 120 can attach any necessary magnification equipment (e.g., magnification lenses or loops) to the mobile device 120 that are needed for interacting with the camera of the mobile device 110 to enable imaging of small features on the test item 150 (such as small-scale indicia). In some embodiments, however, step 302 may not be required.

At step 304, the mobile application 120 can prompt the user to create the test signature for the test item 150. In example embodiments where the test signature is based on new images of the test item 150, step 304 can include the mobile application 120 prompting the user to scan the indicia on the test item 150 or image the test item 150 as necessary for the creation of the test signature. Scanning of the indicia could also prompt the display of pop-up information related to the marked item 150 which may be accessible by the system 100. In this manner, general information regarding the marked item 150 could be viewed by the buyer to ensure that it is consistent with the test item 150 that the buyer is evaluating.

At step 306, the test signature can be transmitted to the authentication service for analysis and execution.

It should also be understood that the creation of the test signature from the one or more new images can either be accomplished locally by the mobile application 120 or remotely on the server 102 housing the authentication system 100. In either location, an AI/ML engine can execute the proper algorithms on the new image(s) to extract features to be used as the test signature if the test signature is based on such AI/ML-derived features.

At step 308, the mobile application 120 receives notification from the server 102 as to whether the test item 150 was declared authentic. However, it should be understood that in some embodiments, the mobile application may make this determination locally (for example, if the server 102 communicates the retrieved reference signature to the mobile application 120 or where the mobile application 120 itself accesses the blockchain 106 using the NFT 108 to retrieve the reference signature). At step 310, the mobile application displays the authentication results (e.g., "Authentic" or "Not Authentic").

Furthermore, a similar mobile application can be used by a seller in a transaction, where the seller's mobile application can collect the seller's user identification data to be tested for purposes of multi-factor authentication as discussed above.

While the invention has been described above in relation to its example embodiments, various modifications may be made thereto that still fall within the invention's scope. These modifications to the invention will be recognizable upon review of the teachings herein. For example, in some use cases, a practitioner may find it unnecessary to mark the item 150 with indicia. For example, there may be circumstances where a highly discriminating reference signature can be created for the item 150 without the need for marking the item 150 with indicia. In these circumstances, a practitioner may choose to omit the marking system 130 from the system 100 and omit step 202 from the FIG. 2 process flow. For example, it may be the case that the item 150 has one or more pre-existing or naturally occurring inclusions or imperfections that can be captured within the reference signature so that additional marking of the item 150 is not needed to impart sufficient uniqueness to the reference signature for the purpose of authentication. For example, with example embodiments where SEM, XRD, or image processing techniques are used to generate the reference signature, such inclusions or imperfections may impart a high degree of uniqueness onto the reference signature.

What is claimed is:

1. A system for authenticating an item, the item comprising jewelry and/or a gemstone, the system comprising:

a marking system configured to mark the jewelry and/or gemstone with indicia;

a sensor system configured to image the marked item to generate one or more images of the marked item, wherein the one or more images comprises an image of the indicia as marked on the item;

a memory; and one or more processors that are configured to:

create a reference signature for the item based on the one or more images of the marked item, wherein the item comprises jewelry and/or a gemstone wherein the reference signature comprises optically detectable characteristics of the marked item, wherein the optically detectable characteristics comprise the indicia;

store the reference signature in the memory in association with the item; and authenticate whether a test item is the same as the item, wherein the test item comprises purported jewelry and/or a purported gemstone, wherein the authentication includes operations that (1) create a test signature for the test item, (2) access the stored reference signature that is associated with the item, and (3) compare the test signature with the accessed reference signature to determine whether a match exists between the test signature and the accessed reference signature, wherein a determined match between the test signature and the accessed reference signature serves to authenticate the test item as being the same as the item.

2. The system of claim 1 wherein the indicia comprises a QR code that encodes a unique identifier for the item, and wherein the reference signature is based on the QR code.

3. The system of claim 1 wherein the reference signature further comprises a plurality of feature values with respect to a set of feature characteristics derived from the one or more images of the marked item.

4. The system of claim 3 wherein the reference signature reflects a plurality of 3D characteristics of the item.

5. The system of claim 1 wherein the reference signature uniquely identifies the item.

6. The system of claim 1 wherein the one or more processors are further configured to create a digital asset for the item, wherein the digital asset links the item with the stored reference signature, and wherein the authentication further includes operations that access the stored reference signature that is associated with the item based on the digital asset.

7. The system of claim 6 wherein the digital asset comprises a non-fungible token (NFT), and wherein the one or more processors are further configured to store the reference signature on a blockchain, wherein the NFT includes a link to the stored reference signature on the blockchain.

8. The system of claim 7 wherein the NFT link points to NFT metadata stored on the blockchain, wherein the NFT metadata comprises the stored reference signature and additional information about the item.

9. The system of claim 7 wherein the one or more processors are further configured to store the reference signature in the memory by distributively storing a plurality of segments of the reference signature across one or more blockchains; and wherein the NFT includes metadata that links to the distributively stored reference signature segments.

10. The system of claim 6 wherein the one or more processors are further configured to provide the digital asset to an owner of the item, wherein the owner is a seller of the item, and wherein the one or more processors are further configured to transfer the digital asset to a buyer of the item in response to the determined match.

11. The system of claim 10 wherein the digital asset comprises a non-fungible token (NFT) for the seller, wherein the NFT includes a link to the stored reference signature on a blockchain, and wherein the one or more processors are further configured to transfer the NFT by (1) minting a new NFT for the buyer, wherein the new NFT is for the item and includes a link to the stored reference signature on the blockchain, and wherein the new NFT serves as the transferred digital asset, and (2) burning the seller's NFT.

12. The system of claim 1 wherein the one or more processors comprise a plurality of processors, wherein the processors include different processors that perform the create and authenticate operations.

13. A system for authenticating an item, the item comprising jewelry and/or a gemstone, the system comprising:

a sensor system configured to image the item to generate one or more images of the item;

a memory; and one or more processors that are configured to:

create a reference signature for the item based on the one or more images of the item; and store the reference signature in the memory in association with the item;

wherein the sensor system is further configured to image a test item to generate one or more images of the test item, wherein the test item comprises purported jewelry and/or a purported gemstone; and wherein the one or more processors are further configured to:

create a test signature based on the one or more images of the test item; and authenticate whether the test item is the same as the item, wherein the authentication includes operations that (1) access the stored reference signature that is associated with the item and (2) compare the test signature with the accessed reference signature to determine whether a match exists between the test signature and the accessed reference signature, wherein a determined match between the test signature and the accessed reference signature serves to authenticate the test item as being the same as the item.

14. The system of claim 13 wherein sensor system comprises a camera of a mobile device, wherein the mobile device camera is configured to take the one or more images of the test item.

15. The system of claim 13 wherein the reference signature is based on (1) electromagnetic properties of the item, (2) acoustical properties of the item, (3) scanning electron microscopy with respect to the item, and/or (4) diffractometry with respect to the item.

16. The system of claim 13 further comprising:

a marking system configured to mark the jewelry and/or gemstone with indicia; and wherein the one or more images of the marked item comprises an image of the indicia as marked on the marked item.

17. The system of claim 13 wherein the sensor system comprises a first camera for imaging the item and a second camera for imaging the test item.

18. A system for applying artificial intelligence (AI) to support authentication of jewelry and/or gemstones, the system comprising:

a sensor system configured to image an item to generate one or more images of the item, wherein the item comprises jewelry and/or a gemstone; and one or more processors configured to:

process the one or more images to extract a plurality of feature values for a set of features about the item, wherein the extracted feature values characterize the item and serve as a reference signature for the item, the reference signature for use in a subsequent authentication of the item;

store the reference signature in a memory; and create a digital asset for the item that is linked to the stored reference signature;

wherein the sensor system is further configured to image a test item to generate one or more images of the test item, wherein the test item comprises purported jewelry and/or a purported gemstone; and wherein the one or more processors are further configured to:

create a test signature based on the one or more images of the test item; and authenticate whether the test item is the same as the item, wherein the authentication includes operations that (1) access the stored reference signature that is associated with the item via the digital asset and (2) compare the test signature with the accessed reference signature to determine whether a match exists between the test signature and the accessed reference signature, wherein a determined match between the test signature and the accessed reference signature serves to authenticate the test item as being the same as the item.

19. The system of claim 18 wherein the sensor system comprises a first camera for imaging the item and a second camera for imaging the test item.

20. A method for applying artificial intelligence (AI) to support authentication of an item, the item comprising jewelry and/or a gemstone, the method comprising:

marking the jewelry and/or gemstone with indicia;

imaging the marked item to generate one or more images of the item, wherein the item comprises jewelry and/or a gemstone wherein the one or more images comprises an image of the indicia as marked on the marked item;

processing the one or more images to extract a plurality of feature values for a set of features about the marked item, wherein the extracted feature values characterize the marked item and serve as a reference signature for the marked item, the reference signature for use in a subsequent authentication of the marked item, wherein the reference signature is based at least in part on optically detectable characteristics of the marked item, wherein the optically detectable characteristics comprise the indicia;

storing the reference signature in a memory; and creating a digital asset for the marked item that is linked to the stored reference signature; and wherein the processing, storing, and creating steps are performed by one or more processors.

* * * * *